US012619412B2

(12) United States Patent
Yoshimoto et al.

(10) Patent No.: US 12,619,412 B2
(45) Date of Patent: May 5, 2026

(54) CONTROL OF COMMUNICATION BETWEEN AN ELECTRONIC DEVICE AND A SECOND ELECTRONIC DEVICE, AND SYSTEM

(71) Applicants:KABUSHIKI KAISHA TOSHIBA, Tokyo (JP); Toshiba Digital Solutions Corporation, Kawasaki (JP)

(72) Inventors: Takehiro Yoshimoto, Tokyo (JP); Akira Ishitsuka, Tokyo (JP)

(73) Assignees: KABUSHIKI KAISHA TOSHIBA, Tokyo (JP); Toshiba Digital Solutions Corporation, Kawasaki (JP)

( * ) Notice: Subject to any disclaimer, the term of this patent is extended or adjusted under 35 U.S.C. 154(b) by 205 days.

(21) Appl. No.: 18/164,692

(22) Filed: Feb. 6, 2023

(65) Prior Publication Data

US 2023/0185555 A1　Jun. 15, 2023

Related U.S. Application Data

(63) Continuation of application No. PCT/JP2021/028790, filed on Aug. 3, 2021.

(30) Foreign Application Priority Data

Aug. 6, 2020　(JP) ................................. 2020-133946

(51) Int. Cl.
　*G06F 8/60*　　　(2018.01)
　*G06F 8/61*　　　(2018.01)
(52) U.S. Cl.
　CPC ..................................... *G06F 8/61* (2013.01)

(58) Field of Classification Search
　CPC ........... G06F 8/61; G06F 13/00; H04W 4/38; H04W 4/70; H04W 48/10; H04W 72/04
　See application file for complete search history.

(56) References Cited

U.S. PATENT DOCUMENTS

2017/0359131 A1　12/2017　Mashimo et al.
2018/0357069 A1*　12/2018　Fujisaki ................ H04W 48/12
(Continued)

FOREIGN PATENT DOCUMENTS

JP　　　2017224875 A　　12/2017
JP　　　2018036165 A　　3/2018
(Continued)

OTHER PUBLICATIONS

Office Action issued on Jan. 31, 2023, in corresponding Japanese Application No. 2020-133946, 8 pages.

*Primary Examiner* — Hanh Thi-Minh Bui
(74) *Attorney, Agent, or Firm* — Maier & Maier, PLLC

(57) ABSTRACT

According to one embodiment, an electronic device is configured to communicate with a second electronic device. A specific application and a first communication application are installed in the second electronic device. A non-specific application and a second communication application are installed in the electronic device. The electronic device is configured to transmit a beacon by means of the second communication application. The beacon includes identification information of a user of the electronic device, identification information of the non-specific application, and transmission information notified to the specific application by the non-specific application.

7 Claims, 24 Drawing Sheets

(56)  References Cited

U.S. PATENT DOCUMENTS

| 2019/0121589 | A1 | 4/2019 | Yoshida |
| 2019/0200277 | A1 | 6/2019 | Kinugawa et al. |

FOREIGN PATENT DOCUMENTS

| JP | 2019077085 | A | 5/2019 |
| JP | 2019114861 | A | 7/2019 |
| JP | 2020-88707 | A | 6/2020 |

* cited by examiner

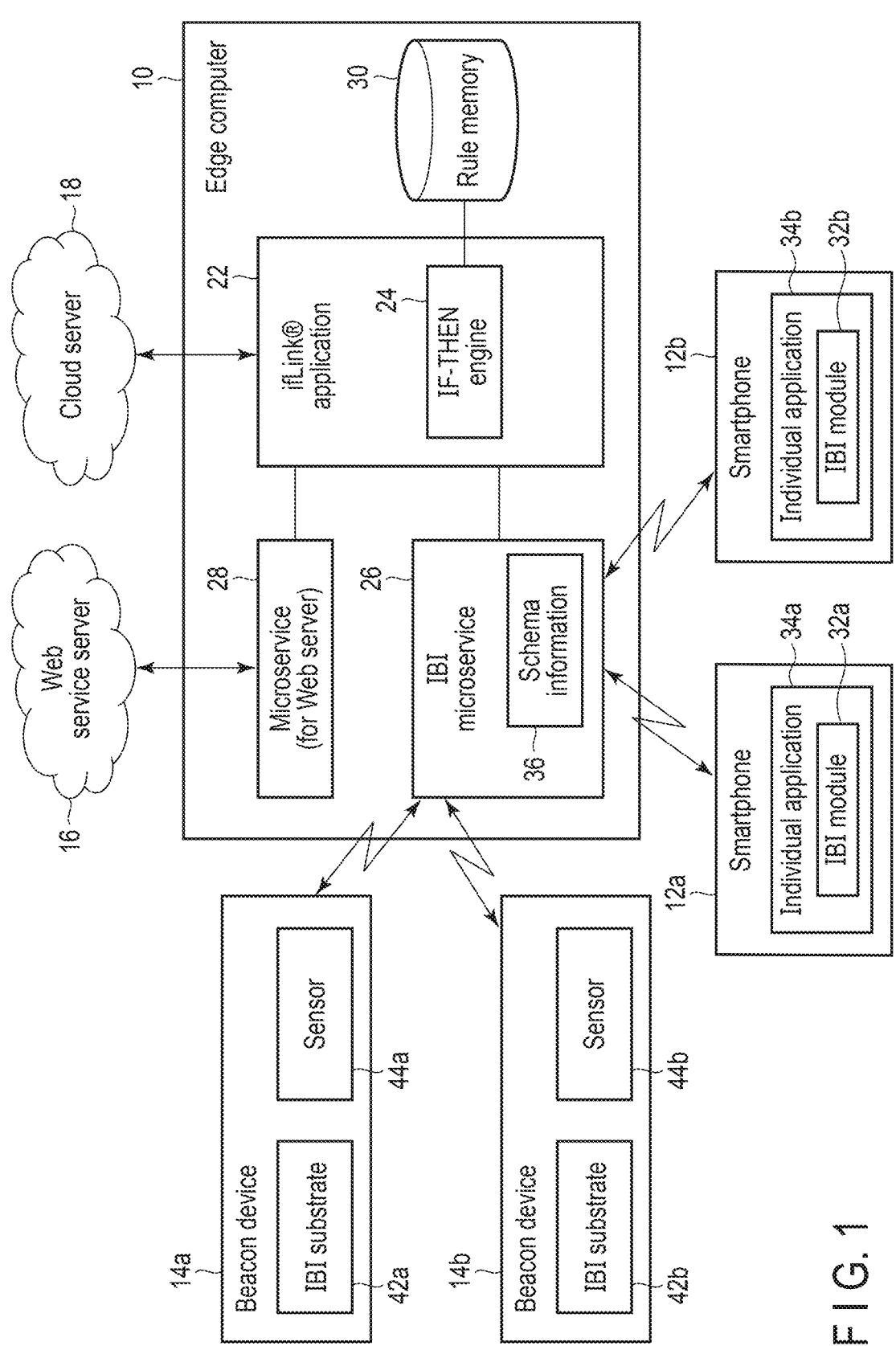
F I G. 1

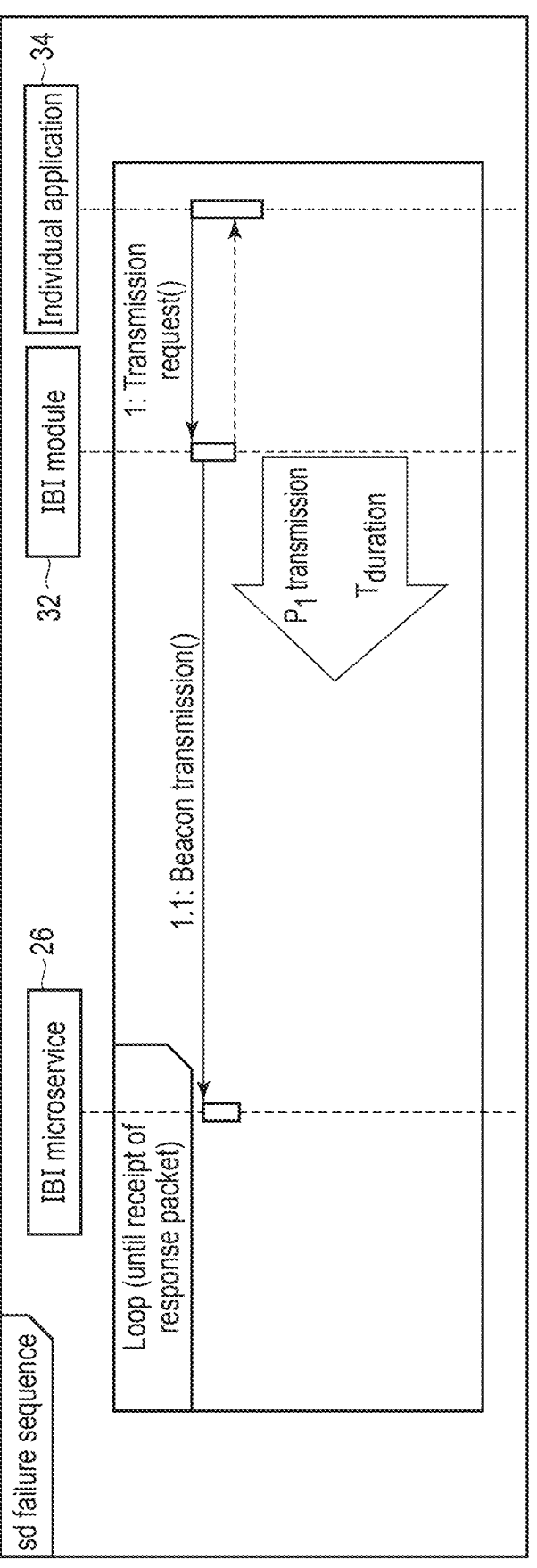
F I G. 2A

| 0 | 1 | 2 | 3 | 4 | 5 | 6 |
|---|---|---|---|---|---|---|
| Length | Data | | Length | Data | | |
| | AD type | AD data | | AD type | Company ID | |
| | | Flags | | | | |
| 0x02 | 0x01 | 0x06 | 0x1C | 0xFF | 0x?? | 0x?? |

F I G. 3A

| 7 | 8 | 9 | 10 | 11 | 12 | 13 | ... | 31 |
|---|---|---|---|----|----|----|-----|-----|
| Member ID | | Module ID | | Frame type | | Parameters | ... | ... |
| 0x?? | 0x?? | 0x?? | 0x?? | | | | ... | ... |

F I G. 3B

| Byte | Length/Data | Data name | Contents |
|------|-------------|-----------|----------|
| 0 | Length | | |
| 1 | Data | AD type | |
| 2 | Data | AD data | |
| 3 | Length | | |
| 4 | Data | AD type | |
| 5-6 | Data | Company ID | Identifier of organization which operates IoT system |
| 7-8 | Data | Member ID | Identifier of company or organization 0x0000: reserved |
| 9-10 | Data | Module ID | Internal identifier of program module for each company or organization 0x0000: reserved |
| 11 | Data | Frame type | Transmission type |
| 12-31 | Data | Parameters | Unique parameters |

F I G. 4

| Byte | | | 0 | | | | | | |
|---|---|---|---|---|---|---|---|---|---|
| Bit | 7 | 6 | 5 | 4 | 3 | 2 | 1 | 0 | |
| Field | REQ/RSP | Reply | Command | | | | | | |
| | 0: Request | 0: Response (not required) | 1: Device registration (unused) | | | | | | |
| | 1: Response | 1: Response (required) | 2: Device registration result (unused) | | | | | | |
| | | | 3: Sensor value notification | | | | | | |
| | | | 4: Job notification | | | | | | |
| | | | 5: Job result notification | | | | | | |

F I G. 5

| Frame type | Set value |
|---|---|
| Sensor value response (no response required) | 0x03 |
| Sensor value response (response required) | 0x43 |
| Sensor value response | 0xC3 |
| Job notification (no response required) | 0x04 |
| Job notification (response required) | 0x44 |
| Job result notification | 0xC4 |

F I G. 6

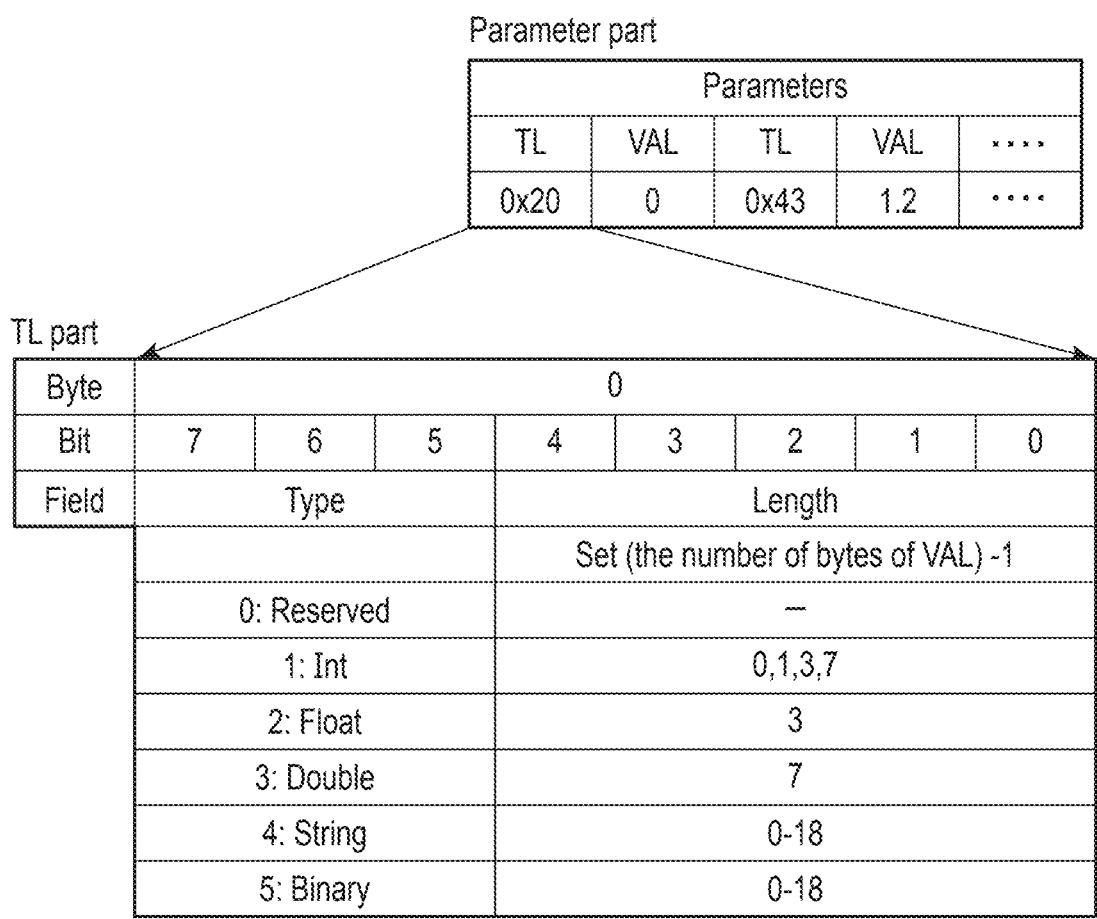

Parameter part

| Parameters | | | | |
|---|---|---|---|---|
| TL | VAL | TL | VAL | · · · · |
| 0x20 | 0 | 0x43 | 1.2 | · · · · |

TL part

| Byte | 0 | | | | | | | |
|---|---|---|---|---|---|---|---|---|
| Bit | 7 | 6 | 5 | 4 | 3 | 2 | 1 | 0 |
| Field | Type | | Length | | | | | |
| | | | Set (the number of bytes of VAL) -1 | | | | | |
| | 0: Reserved | | — | | | | | |
| | 1: Int | | 0,1,3,7 | | | | | |
| | 2: Float | | 3 | | | | | |
| | 3: Double | | 7 | | | | | |
| | 4: String | | 0-18 | | | | | |
| | 5: Binary | | 0-18 | | | | | |

F I G. 7

| TL part | Set value |
|---|---|
| Int type (1 byte) | 0x20 |
| Int type (2 bytes) | 0x21 |
| Int type (4 bytes) | 0x23 |
| Int type (8 bytes) | 0x27 |
| Float type (4 bytes) | 0x43 |
| Double type (8 bytes) | 0x67 |
| String type (1 byte) | 0x80 |
| String type (6 bytes) | 0x85 |
| String type (19 bytes) | 0x92 |
| Binary type (1 byte) | 0xA0 |
| Binary type (19 bytes) | 0xB2 |

F I G. 8

Example of schema information

```
Device name:"SampleDevice1", "SampleDevice2"
schema information:
<?xml version="1.0" encoding="utf-8"?>
<schema name="SampleDevice1">
  <property name="devicename" type="string" />
  <property name="deviceserial" type="string" />
  <property name="timestamp" type="timestamp" />
  <property name="memberid" value="0x0000" />
  <property name="moduleid" value="0x0001" />
  <property name="param1" type="float" />
  <property name="param2" type="int" />
  <property name="param3" type="string" />
  <property name="param4" type="string" />
</schema>
<schema name="SampleDevice2">
  <property name="devicename" type="string" />
  <property name="deviceserial" type="string" />
  <property name="timestamp" type="timestamp" />
  <property name="memberid" value="0x0000" />
  <property name="moduleid" value="0x0002" />
  <property name="param1" type="float" />
  <property name="param2" type="int" />
  <property name="param3" type="string" />
  <property name="param4" type="string" />
</schema>
```

F I G. 9

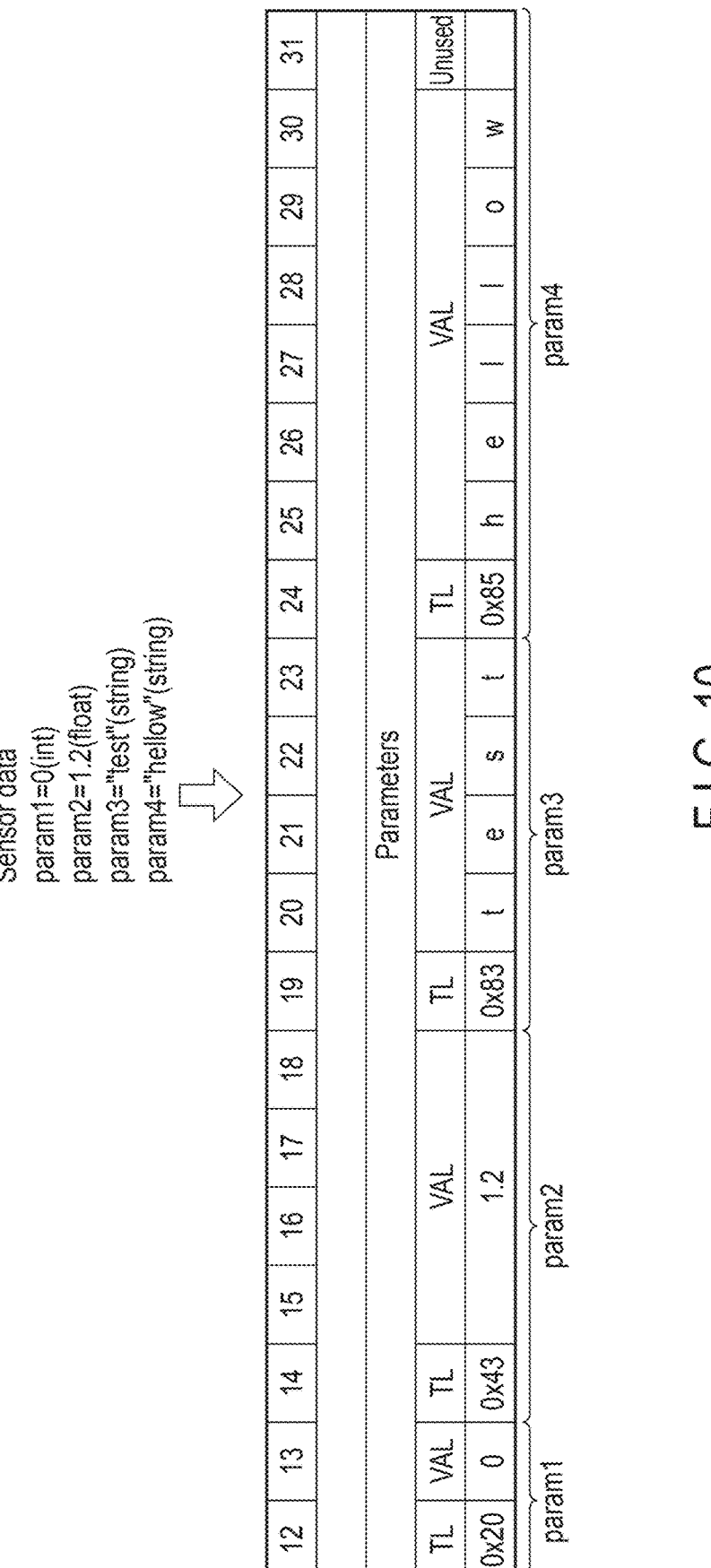
F I G. 10

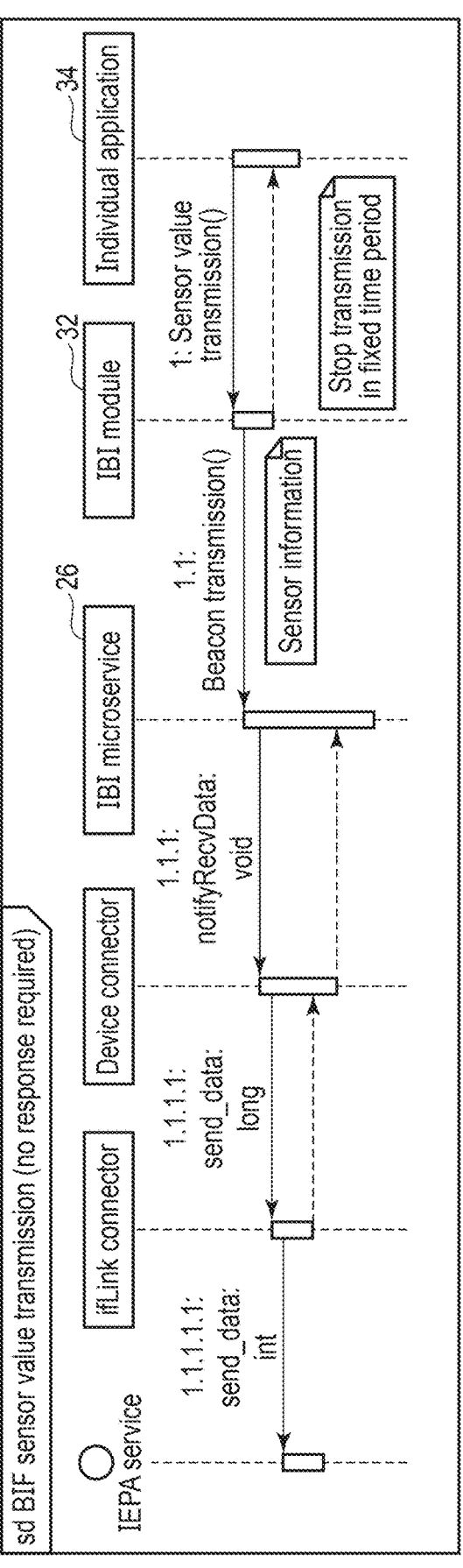
F I G. 11A

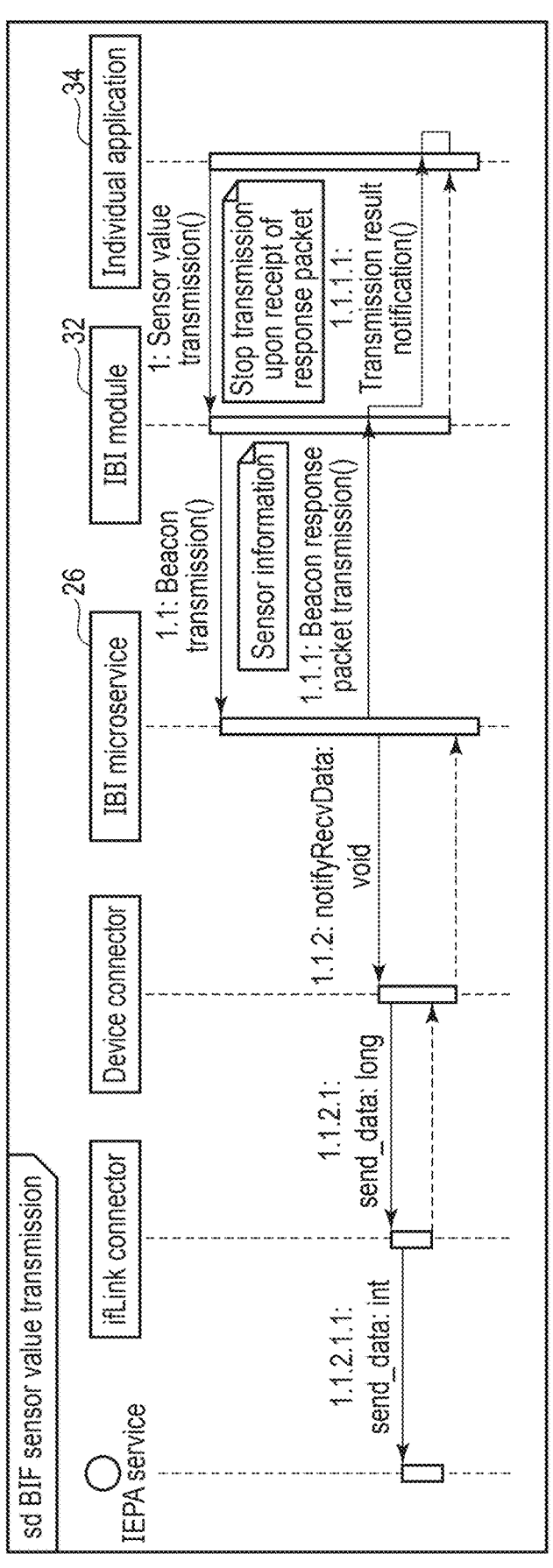
F I G. 11B

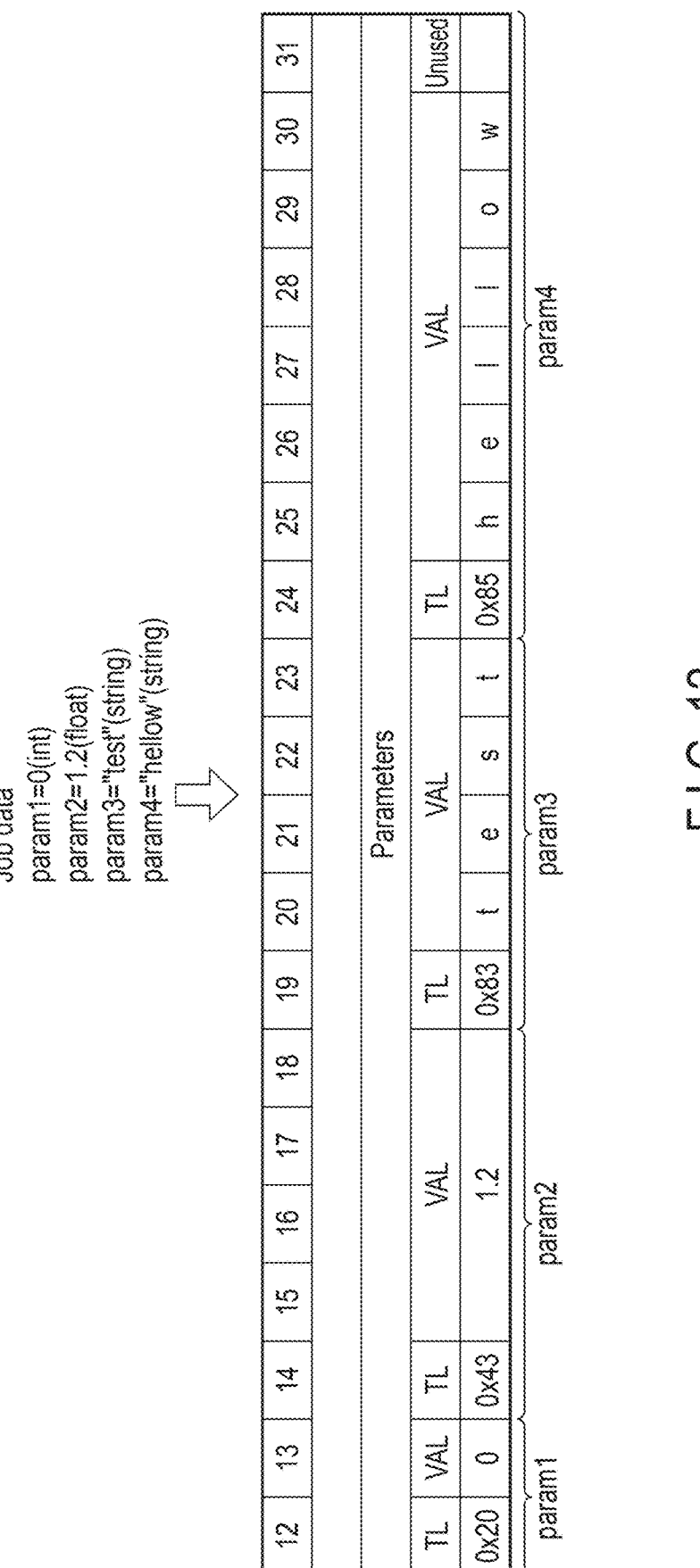
F I G. 12

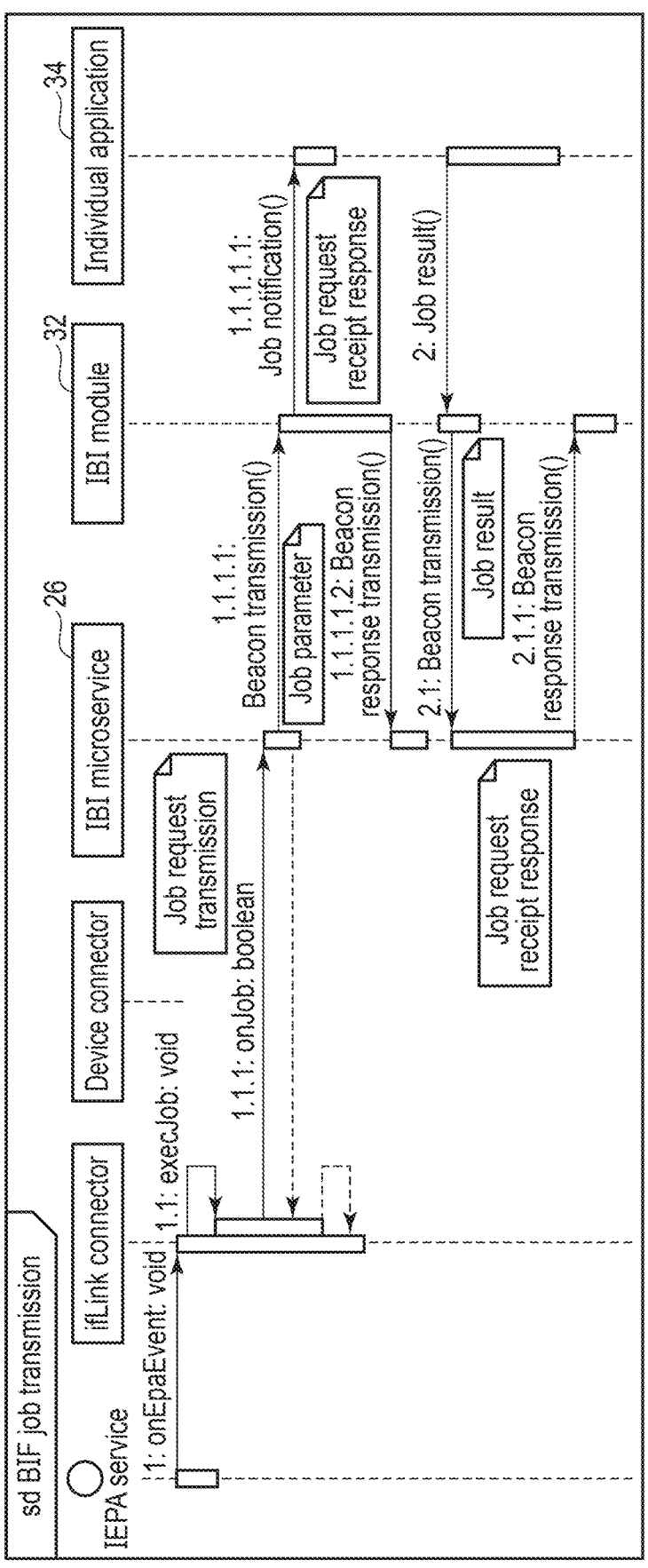
F I G. 13B

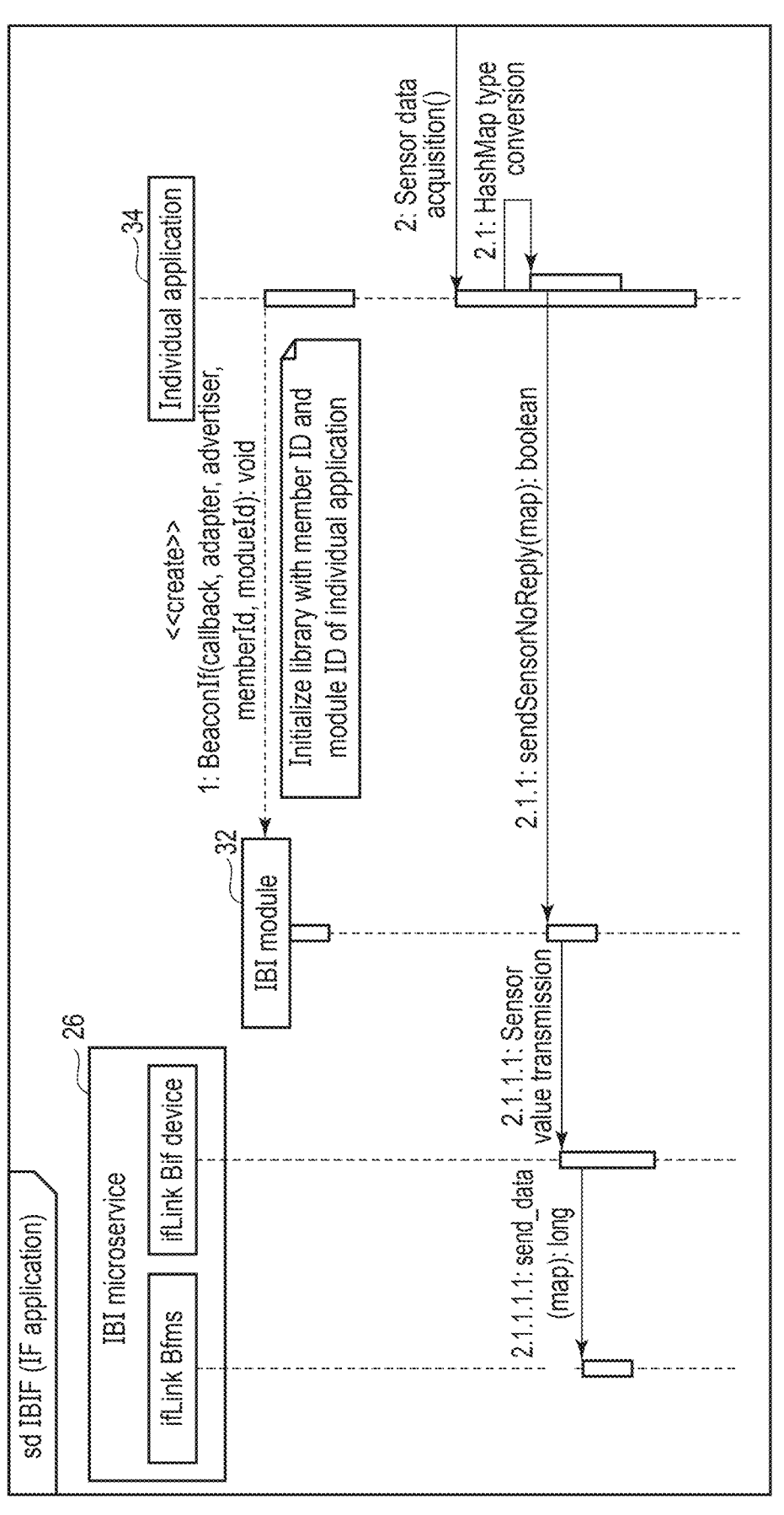
F I G. 14

Example of schema information

```
Application name:"IFApplication1"
schema information:
<?xml version="1.0" encoding="utf-8"?>
<schema name="IFApplication1">
   <property name="applicationname" type="string" />
   <property name="applicationserial" type="string" />
   <property name="timestamp" type="timestamp" />
   <property name="memberid" value="0x0000" />
   <property name="moduleid" value="0x0001" />
   <property name="param1" type="int" />
   <property name="param2" type="float" />
   <property name="param3" type="string" />
   <property name="param4" type="string" />
</schema>
```

FIG. 15

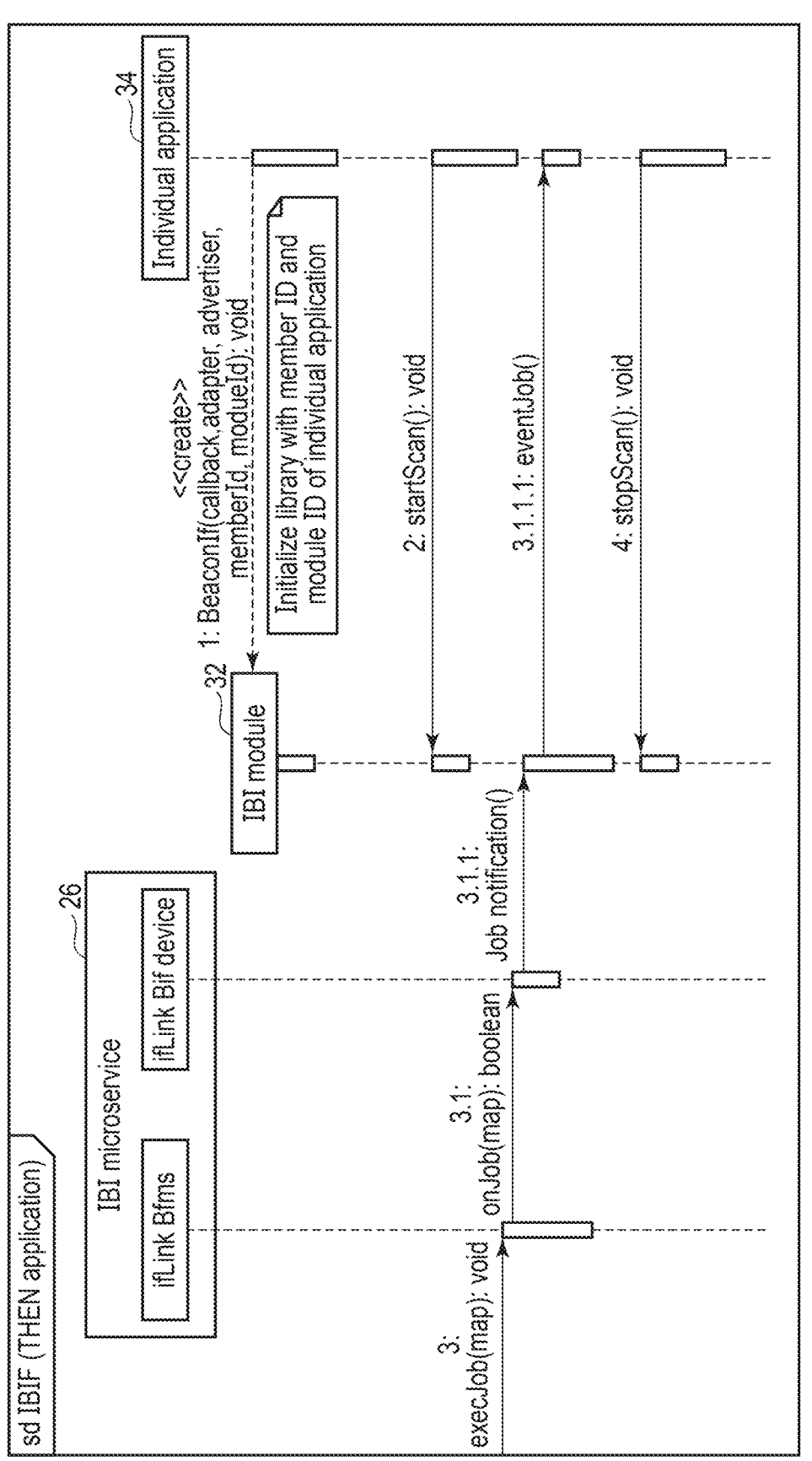
F I G. 16

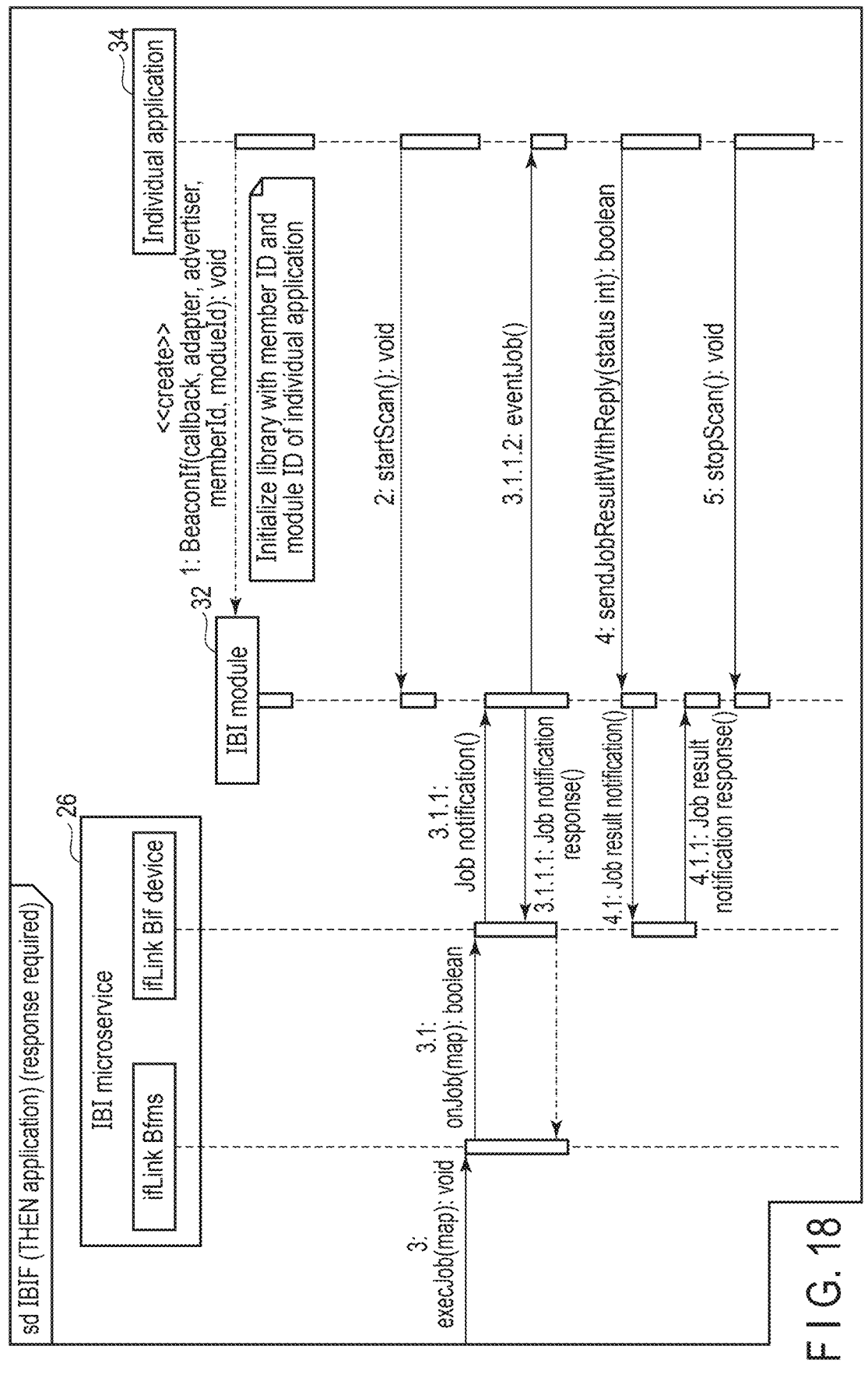
F I G. 18

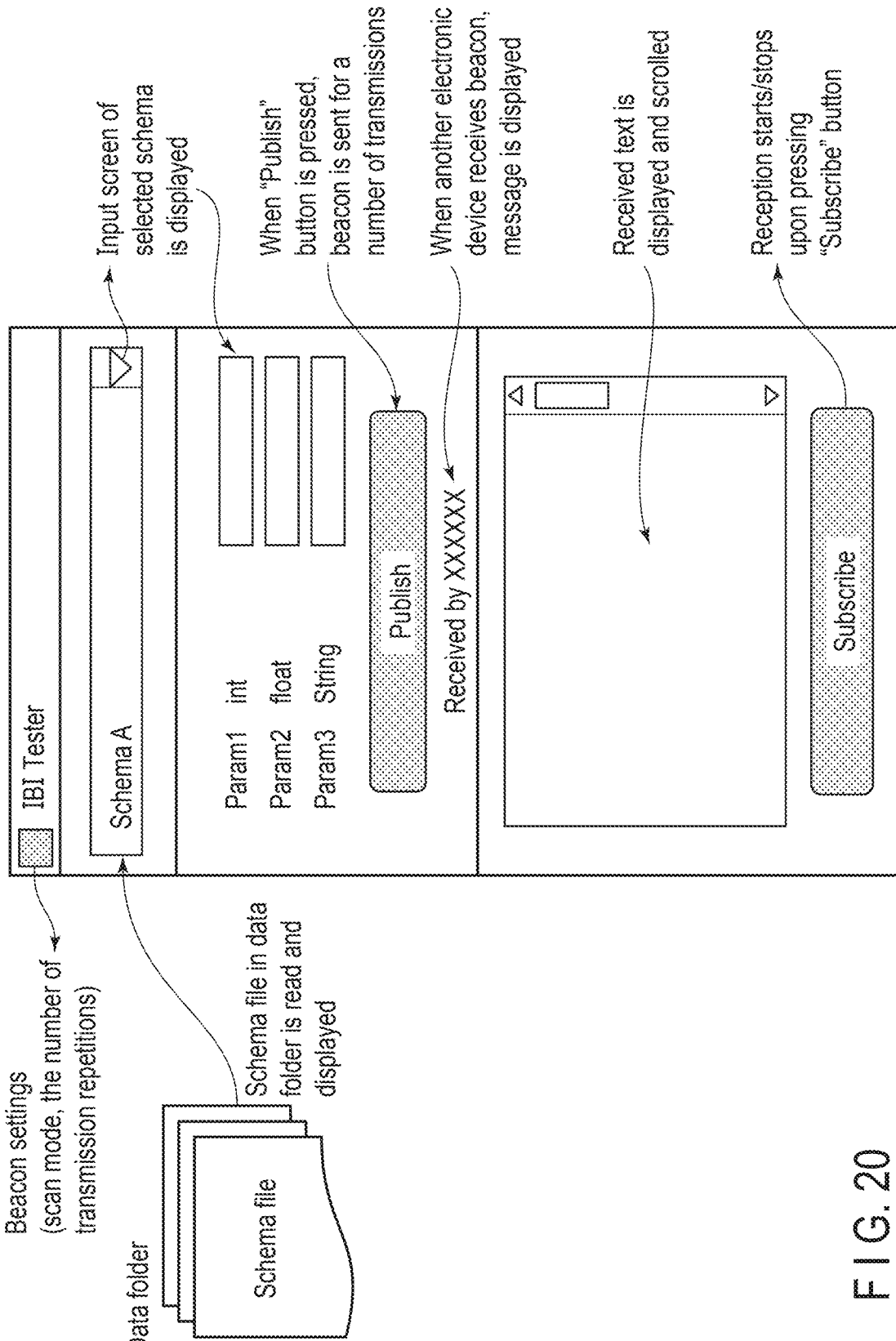
F I G. 20

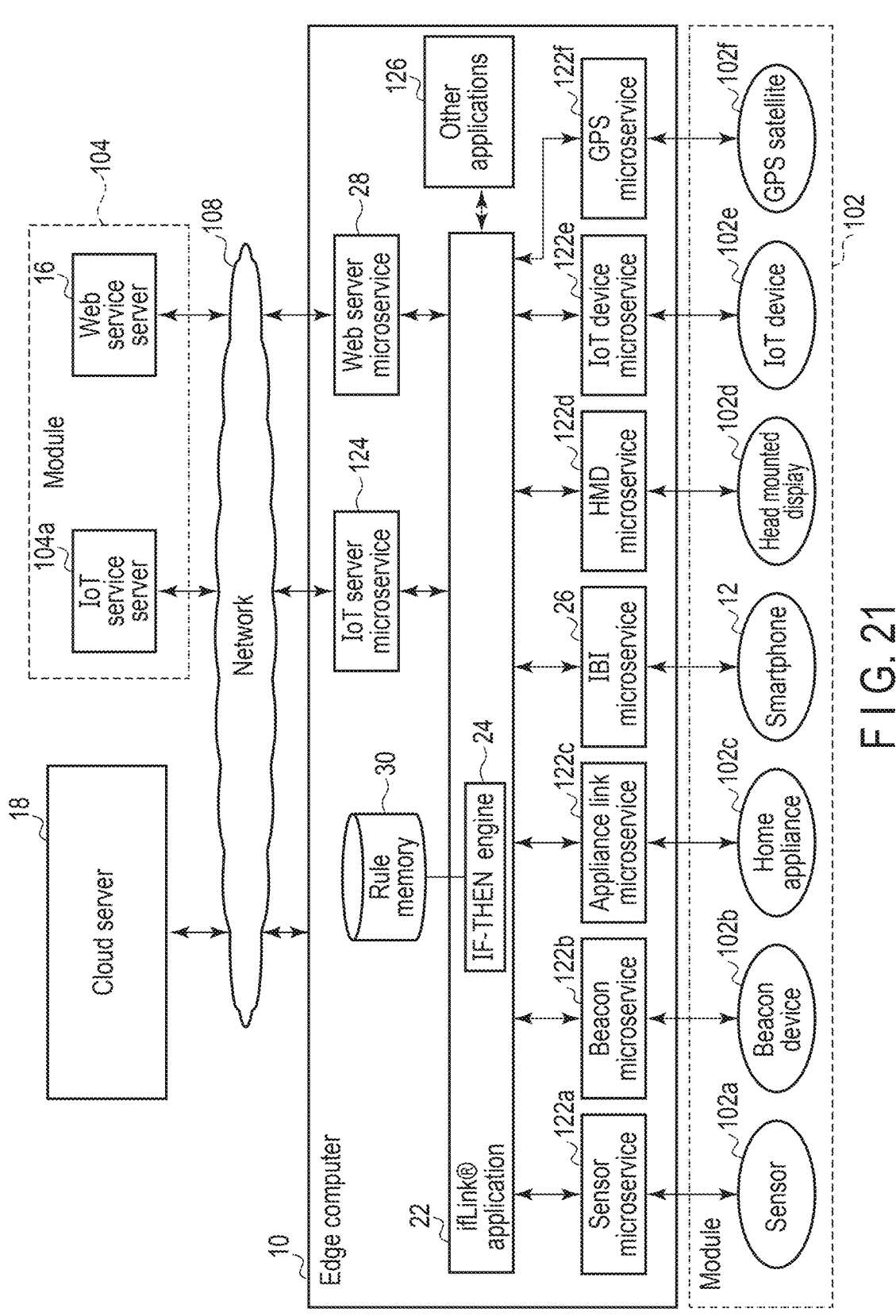
F I G. 21

CONTROL OF COMMUNICATION BETWEEN AN ELECTRONIC DEVICE AND A SECOND ELECTRONIC DEVICE, AND SYSTEM

CROSS-REFERENCE TO RELATED APPLICATIONS

This application is a Continuation Application of PCT Application No. PCT/JP2021/028790, filed Aug. 3, 2021 and based upon and claiming the benefit of priority from Japanese Patent Application No. 2020-133946, filed Aug. 6, 2020, the entire contents of all of which are incorporated herein by reference.

FIELD

Embodiments described herein relate generally to an electronic device and a system.

BACKGROUND

An internet of Things (IoT) system which links objects (referred to as devices) in real space via the internet is becoming popular. An example of the IoT system includes a first device, a second device, and a controller. The controller receives an output of the first device. When the controller detects that the state indicated by the output of the first device is a specific state, the controller gives an instruction to the second device to perform a specific operation. In such an IoT system, it is difficult to have the first device and the second device communicate with the controller if the communication method of the first device and the communication method of the second device are different from the communication method of the controller. Therefore, it is difficult to create an IoT system using existing devices and controllers.

BRIEF DESCRIPTION OF THE DRAWINGS

FIG. 1 illustrates an example of an IoT system including an electronic device according to an embodiment.

FIG. 2A illustrates an example of sending and receiving a beacon packet.

FIG. 3A illustrates an example of a structure of a beacon packet.

FIG. 3B illustrates an example of the structure of the beacon packet.

FIG. 4 illustrates an example of data contained in a beacon packet.

FIG. 5 illustrates an example of a frame type structure.

FIG. 6 illustrates an example of a frame type set value.

FIG. 7 illustrates an example of a structure of a parameter part included in a beacon packet.

FIG. 8 illustrates an example of set value of a TL part.

FIG. 9 illustrates an example of schema information of the embodiment.

FIG. 10 illustrates an example of parameters in a beacon packet for sensor value notification.

FIG. 11A illustrates an example of sending and receiving a beacon packet for sensor value notification.

FIG. 11B illustrates another example of sending and receiving a beacon packet for sensor value notification.

FIG. 12 illustrates an example of parameters in a beacon packet for job notification.

FIG. 13B illustrates another example of sending and receiving a beacon packet for job notification.

FIG. 14 is a sequence diagram illustrating an example of sending and receiving a beacon packet.

FIG. 15 illustrates an example of schema information.

FIG. 16 is a sequence diagram illustrating an example of sending and receiving a beacon packet.

FIG. 18 is a sequence diagram illustrating another example of sending and receiving a beacon packet.

FIG. 20 illustrates an example of a screen display of a smartphone.

FIG. 21 illustrates another example of an IoT system including the electronic device of the embodiment.

DETAILED DESCRIPTION

Figure 2B:
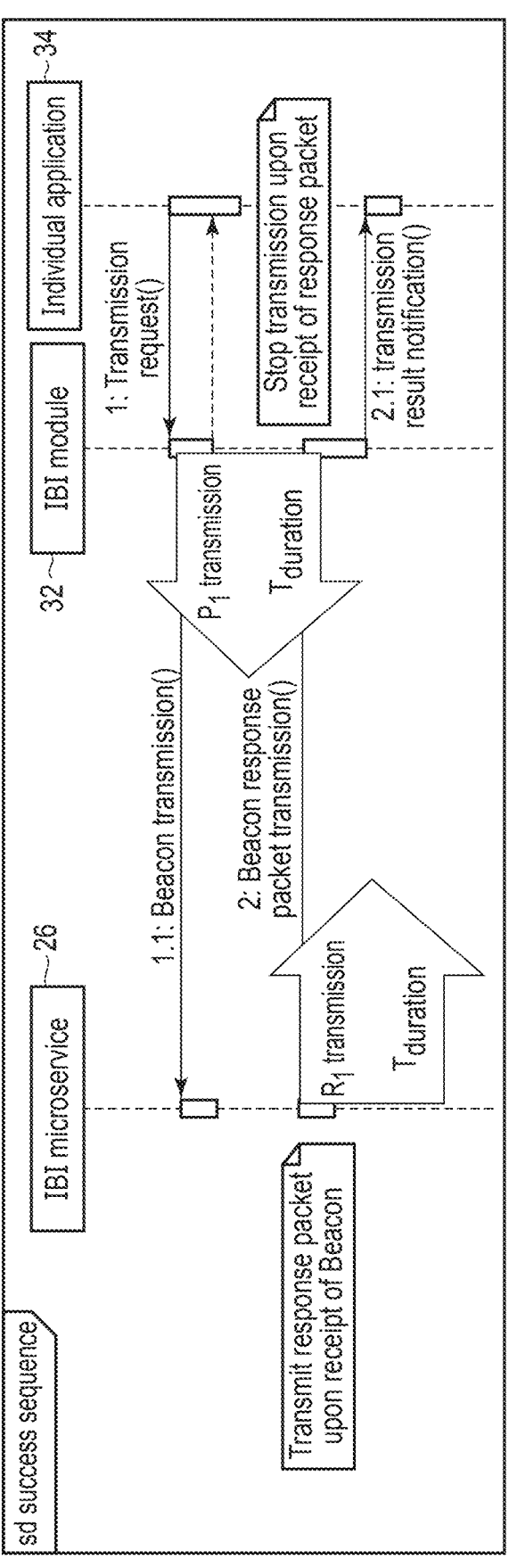
FIG. 2B illustrates another example of sending and receiving a beacon packet.

Various embodiments will be described hereinafter with reference to the accompanying drawings. The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic device is configured to communicate with a second electronic device. A specific application and a first communication application are installed in the second electronic device. The specific application is not installed in the electronic device. A non-specific application and a second communication application are installed in the electronic device. The second communication application is communicable with the first communication application. The electronic device is configured to transmit a beacon by means of the second communication application. The beacon includes identification information of a user of the electronic device, identification information of the non-specific application, and transmission information notified to the specific application by the non-specific application.

Embodiments relate generally to an IoT system by which a plurality of modules are linked in accordance with rule information ruling "if X happens, then Y is performed".

The modules which are the objects linked by the IoT system are not limited to physical devices in the real world, but also include service provided by software. The service includes e-mail service provided by a program installed in the device, SNS service, and web service provided by a web service server.

The Physical devices include anything which is used to realize a given function. The physical devices include a device to perform an operations, a device to display content, and a storage devices to store data.

The content refers to a specific content related to a given function, and has a specificity by which difference from others can be individually identifiable. For example, the content does not include an abstract concept such as "movie" but includes a specific content with a "movie name (title)" as a means of identifying it from other contents. Similarly, the content does not include the abstract concept of a "Web screen" displayed on a Web browser, but includes a specific Web page located on a specific URL.

The device may have a built-in communication function to communicate with external devices. The device may be configured to act on physical or chemical states or phenomena in nature. The device which acts passively on the natural world includes a sensor and the like. The device which actively acts on the natural world include a robot, a drive mechanism, and a display device. The physical form of the device is not limited to a stationary type, but may also be a portable type which can be moved. An example of the physical form of the device includes a band-type sensor which is fixed to a user's arm or leg, a belt-type sensor which is fixed to a waist, a VR-type, or an AR-type head-mounted display which is worn on a head, and other forms which can be worn by the user.

The service is an active operation which is a combination of controls of a specific entity/state/information to provide a change of a specific operation or state, or a content, or data/information to a user for a fee or free of charge. In the embodiment, the service is provided to the user according to rule information. As a form of the service provision, the embodiment may provide a combination (composite) service which crosses the boundary between services in real or physical space using various devices and services in cyberspace using Web services, etc.

The rule information is information to describe a rule, which is a definition of how to combine multiple modules, allowing devices and services to be freely combined. Therefore, an IoT system based on the rule information can provide a convenient mechanism for various scenes in the home, company, and society.

An example of the rule is that a specific device performs a specific operation when the state detected by the sensor is a specific state. The rule information describing the rule can be in various formats. An example of the rule information is an IF-THEN format rule, including condition information indicative of a specific state (may be referred to as an IF part) and operation information indicative of a specific operation performed when the state detected by the sensor is a specific state (may be referred to as a THEN part). However, the format of the rule information is not limited to the above example.

The number of IF parts and THEN parts in a single rule information, i.e., the number of states to be detected and the number of operations to be performed, are not limited to one each. For example, the rule information may be described such that one operation is performed when multiple states are respectively multiple specific states. Alternatively, the rule information may be described such that multiple operations are performed when one state is a single specific state. Furthermore, the rule information may be described such that multiple operations are performed when multiple states are respectively multiple specific states.

An example of the IF-THEN format rule information includes, but are not limited to:

"The lamp will emit light for five seconds to inform the operator if an object weighing more than 200 grams is placed on the tray";
"If the temperature exceeds 26 degrees, the air conditioner will operate in a cooling mode";

"If the machine tool stops vibrating for more than 10 seconds, the display device will show the warning message for 20 seconds to notify the operator";
"When a foreigner arrives at the entrance, the voice synthesizer will begin providing a voice guidance of the museum in the foreign language"; and
"If the heart rate exceeds 120, the e-mail software will send a notification e-mail to the individual".

In the rule information of "If the temperature exceeds 26 degrees, the air conditioner will operate in a cooling mode", the modules (in this case, devices) to be linked by the IoT system are a temperature sensor (IF device) which detects a temperature and an air conditioner (THEN device) which performs a cooling mode operation.

System Structure

FIG. 1 illustrates an example of an IoT system including an electronic device according to an embodiment. The IoT system includes a cloud server 18, edge computer 10 as the electronic device, smartphones 12a and 12b (collectively referred to as smartphone 12 when no distinction is necessary), beacon devices 14a and 14b (collectively referred to as beacon device 14 when no distinction is necessary), and web service server 16.

An ifLink (registered trademark) application 22 as a specific application is installed in the edge computer 10. The ifLink is a platform for creating an IoT system by linking multiple modules based on the IF-THEN format rule information. The ifLink application 22 is downloaded from the cloud server 18.

The smartphone 12, beacon device 14, and web service server 16 are examples of modules. The edge computer 10 is connected to the smartphone 12 and the beacon device 14 wirelessly. For convenience of explanation, the number of the smartphones 12 and the beacon devices 14 are two each. But the numbers of the smartphones 12 and the beacon devices 14 are arbitrary. Three or more smartphones 12 and beacon devices 14 may be connected to the edge computer 10.

Individual applications as non-specific applications 34a and 34b and IBI (ifLink Beacon Interface) modules 32a and 32b are installed in each of the smartphones 12a and 12b. The IBI is as an interface for communication with the edge computer 10 (details will be described below). The individual applications 34a and 34b are collectively referred to as individual applications 34 when no distinction is necessary. The IBI modules 32a and 32b are collectively referred to as IBI modules 32 when no distinction is necessary. The IBI module 32 as a second communication application is a software module which implements the IBI. The IBI module 32 is downloaded from the cloud server 18. The IBI module 32 is a library, and thus, developers download the IBI module 32 and incorporate it into their software to create a finished software (individual application software).

Each of the beacon devices 14a and 14b includes sensors 44a and 44b (collectively referred to as sensor 44 when no distinction is necessary) and IBI substrates 42a and 42b (collectively referred to as IBI substrate 42 when no distinction is necessary). Unlike the smartphone 12, no applications can be installed in the beacon device 14. Therefore, the IBI substrate 42 which implements the IBI is incorporated into the beacon device 14. The beacon device 14 may include not only a sensor but also a light emitting device such as an LED or a display device such as an LCD.

The module which detects a state will be referred to as an IF module, and the module which performs an operation will be referred to as a THEN module.

An example of the IF module includes, but are not limited to, a temperature sensor, humidity sensor, door, alcohol detector, open/close sensor, beacon, human sensor, water leak sensor, generator chair, generator floor, weight sensor, combined multi-function sensor (light, temperature, humidity, acceleration, gyros, etc.), thermometer, weight scale, microphone, hygrometer, and camera. An example of the THEN module includes, but are not limited to, a communication robot, power strip, notification watch, wristband, LED, remote control for electronic devices, emailing, map display, and voice synthesis.

The smartphone 12 can function as the IF module or THEN module by executing individual application 34. The beacon device 14 including the sensor 44 is the IF module. Note that, the smartphone 12 may include a sensor as the IF module. However, since the output of the sensor is output via the individual application 34 and the operation of the sensor is controlled via the individual application 34, the smartphone 12 with a built-in sensor functions as an IF module by executing the individual application 34. Similarly, the smartphone 12 with a built-in display, buzzer, vibrator, etc., functions as a THEN module by executing the individual application 34.

If a single module has the function of detecting a state and performing an operation, there is no need to have separate IF module and THEN module. An IoT system can be created with only one module and the edge computer 10. For example, if an illuminance sensor with an LED is connected to the edge computer 10, an IoT system which follows the IF-THEN format rule information to turn on the LED when the illuminance is above a threshold value can be realized.

As shown in FIG. 1, an example of rule information for the case where the smartphone 12 functions as an IF module/THEN module is as follows.

When a user with the smartphone 12 approaches a certain location, information about the location is displayed on the smartphone 12.

When the game is completed on the smartphone 12, a Kusudama (ornamental ball) (either a Kusudama on the screen of smartphone 12 or an actual Kusudama) is broken.

If you take a photo with the smartphone 12, the photo will be shared with others nearby.

The edge computer 10 downloads and stores the ifLink application 22 from the cloud server 18 to link modules according to the IF-THEN format rule information. An example of the edge computers 10 includes, but are not limited to, a personal computer, smartphone, tablet computer, signage, gateway, and router. Locations of the edge computer 10 include a transportation equipment such as a truck, train, ship, and aircraft, as well as a facility such as a hospital, factory, apartment, private residence (voice synthesis, email, and social networking service), agricultural facility, fishing facility, forestry facility, school, and park.

The ifLink application 22 determines whether the state detected by the IF module is a specific state based on a signal transmitted from the IF module. If the detected state is a specific state, the ifLink application 22 gives instructions to the THEN module to perform a specific operation. Specifically, the ifLink application 22 includes an IF-THEN engine 24 for performing operations in accordance with the rule information stored in the rule memory 30. The IF-THEN engine 24 determines whether or not the state detected by the IF module is a specific state described in the rule information. If the detected state is a specific state, the IF-THEN engine 24 issues an application programming interface (API) command to perform a specific operation based on the rule information via the first communication application (IBI microservice 26).

The ifLink application 22 (IF-THEN engine 24) may be provided with the cloud server 18. Instead of providing a cloud server 18 and an edge computer 10 separately, a single electronic device which includes the functions of both may be provided, and the single electronic device may have the built-in ifLink application 22 (IF-THEN engine 24).

The IBI microservice 26 communicates wirelessly with the smartphone 12 (individual application 34) or the beacon device 14 (sensor 44) to link the smartphone 12 (individual application 34) or the beacon device 14 (sensor 44). The IBI is an interface to use a beacon to connect the ifLink application 22 of the edge computer 10 to the individual application 34 of the smartphone 12 or the sensor 44 of the beacon device 14. The Beacon used by the IBI are, for example, an advertising packet used in the Bluetooth (registered trademark) low energy (BLE) function, or a Wi-Fi (registered trademark) beacon.

The IBI microservice 26 includes schema information 36. The IBI microservice 26 processes data received from the IF modules as different information based on the schema information and according to the source module of the data. For example, the type of data is different for a weight scale and a headcount scale. The data sent from the scale is a real number value (kg), while the data sent from the headcount scale is an integer value (persons). Similarly, the IBI microservice 26 processes control signals from the THEN modules as different information based on the schema information and according to the module to which the data is sent. The IBI microservice 26 determines the type of data according to the schema information 36. This allows one IBI microservice 26 to respond to signals from various modules and to send the control signals to various modules.

As can be understood from the above, the schema information is information for connecting the smartphone 12 (individual application 34) and the beacon device 14 (sensor 44) to the IBI microservice 26. Based on the schema information, the IBI microservice 26 determines which smartphone 12 (individual application 34) and beacon device 14 (sensor 44) should be connected to. As described below, the schema information includes identification information of the smartphone 12 (individual application 34) and beacon device 14 (sensor 44), and the information to be transmitted/received.

When connecting the smartphone 12 and the beacon device 14 to the IBI microservice 26, the schema information may be set by an developer of the IoT system, or a developer of the smartphone 12 (individual application 34) and a developer of the beacon device 14 (sensor 44) may create schema information 36 for each of the smartphone 12 (individual application 34) and the beacon device 14 (sensor 44), and store the information in the cloud server 18. The developer of the IoT system may download schema information 36 from the cloud server 18 and use the downloaded information. As described above, separate persons may create and use the schema information 36.

Web microservice 28 accesses the Web service server 16 to obtain Web service. An example of specific control of the Web microservice 28 includes, but are not limited to, a control of automatically writing necessary information within the frame of a form element specified in Hyper Text Mark-Up Language (HTML) and a control of transitions between Web pages. As described above, by providing the Web microservice 28 in the edge computer 10, users can enjoy advanced service such as Web service. Thus, the edge computer 10 can link the services provided by the smartphone 12, beacon device 14, and Web service server 16.

Here, some terms will be further explained.

Microservice:

It means a control means formed by a program using an object-oriented programming language. The control target of the microservice is not limited to a physical device, but includes processing, content, and information/data. Therefore, a program software using AI technology to control transitions between Web pages or screen operations corresponding to specific Web pages is also included as a type of the microservice or a part of the microservice. Similarly, a program software which uses AI technology to automatically extract the number of people appearing in specific video content, for example, or a program software to analyze acquired data (using statistical analysis, for example) is also a type of the microservice. When specifying control procedures in a program using object-oriented programming languages such as Java (registered trademark) language or object C language, it is possible to make effective use of previously created program assets (incorporation (importing) in other programs, invocation (issuing API commands), for example). Furthermore, if the program is written in Java language, which is OS-independent, the versatility of the means of control is improved.

Control Method:

It means a program which constitutes a part of microservice and specifies detailed procedures to realize a specific individual detailed function. Each control method is treated as the smallest functional unit, or subprogram, which realizes an individual detailed function. An API command from the IF-THEN engine 24 can call name of the control method corresponding to the specific individual detailed function as a corresponding function (command). Thus, the individual detailed function corresponding to the name of the control method can be performed in the IF-THEN engine 24.

Control Class:

It means, among the individual control methods, a set of collections of common and similar functions in the methods. The control method corresponding to the initial setting function of the generated instance (entity) will be referred to as constructor. The constructor name (name of the control method corresponding to the constructor) in the same aggregate may be matched with the control class name. The control class corresponds to a management unit which collects control methods for each common similar function in the microservices. Therefore, there may be multiple different control classes in the same microservice for the same purpose of use.

Control Package:

It means a set of classes with similar functions. That is, it is defined according to the mechanism to manage a collection of classes with similar functions by dividing them into folders. The control package may be divided for each of multiple functions included in the same module. Each control package name (identification information for each control package) may be set individually. Thus, the individually set control package names (identification information for each control package) can be used to identify the contents of each function. When setting the name of the control package to control a device belonging to a function, identification information of a manufacturer or seller of the module, type information of the module, and a serial number of each module may be used (set) as the identification information for each control package.

API Command:

It means the communication tool between the IF-THEN engine 24 and the microservice, used to operate individual microservice from the IF-THEN engine 24. The microservice has a hierarchical structure of control package/control class/control method. In many cases, individual detailed function operations are performed in units of control methods by specifying specific control method names which indicate detailed procedures (programs) to realize individual detailed functions. For example, if the individual detailed function of the specific control method is desired to be performed in the ifLink application 22 written in Java language, the control class in the control package which contains the corresponding control method in the class of the ifLink application 22 is first incorporated. By specifying the name of the corresponding control method in the above class or method, this individual detailed function is performed.

Basic Specification of IBI

Now, the IBI which is the interface between the ifLink application 22 in the edge computer 10 and the individual application 34 in the smartphone 12 or the sensor 44 in the beacon device 14 will be described. In the embodiment, illustrated will be an example of using the adverting packets used in the BLE function (hereinafter referred to as beacon packets) to transmit data and acknowledge receipt. For this purpose, the IBI module 32 or the IBI substrate 42 includes at least the ability to transmit and receive beacon packets.

The IBI microservice 26 communicates with the ifLink application 22 using the inter-application coordination mechanism provided by the OS (AIDL in the case of Android (registered trademark)). This requires that the IBI microservice 26 and the ifLink application 22 are in the same terminal (edge computer 2). However, IBI does not have such restriction.

Therefore, even the ifLink application 22 is not installed in the smartphone 12, it is possible to link the individual applications 34 and the ifLink application 22 using beacon packets if the IBI module 32 is installed in the smartphone 12. This can promote the widespread use of the ifLink.

Furthermore, a device which cannot install an application (IBI module 32), such as the beacon device 14, may incorporate an IBI substrate 42 on which the IBI is implemented such that the individual elements included in the beacon device 14 such as the sensor 44 and the ifLink application 22 can be linked using the beacon packet.

The beacon packet is a short packet which is always sent out for Bluetooth connection between the smartphone 12 and the beacon device 14 with the edge computer 10. The beacon packet is 32 bytes long, for example. The first 7 bytes are a Bluetooth area and the remaining 25 bytes are a user area. The user area is considered as an IBI area and contains the application ID/service ID and the communication data part. The application ID/service ID is the identification information of the module with which the IoT system is linked. The application ID is the identification information of the individual application 34 of the smartphone 12 or the sensor 44 of the beacon device 14. The service ID is the identification information of the service such as the web service server 16.

The IBI realizes simple communication using the beacon packet, and then realizes the sensor value (data) notification function and job notification function necessary to link the ifLink application 22 with the individual application 34 or the sensor 44. The sensor value notification function is an instruction (job notification) to a non-specific application. The sensor value notification function is an example of a function which sends a detection result of a sensor as an IF module to the ifLink application 22. The job notification function is an example of a function in which the ifLink application 22 instructs processing (job) to a module. The ifLink application 22 instructs the IF module to send detection results or the THEN module to perform the processing.

Basic Operation of IBI Communication (1) When the developer of the IoT system connects the smartphone 12 (individual application 34) to the ifLink application 22, the developer checks whether the cloud server 18 stores the schema information of the individual application 34. If the cloud server 18 stores the schema information of the individual application 34, the IoT system developer downloads the schema information of the individual application 34. If the cloud server 18 does not store the schema information of the individual application 34, the developer creates the schema information of the individual application 34 and then performs the setting.

(2) The IT system developer registers the schema information 36 to the IBI microservice 26 using an IMS setting (a feature which allows the cloud server 18 to send settings to the ifLink microservice (IMS) in the smartphone).

(3) The developer of the IoT system registers (Activation) the identification information (devicename, deviceserial as described below) of the smartphone 12 which communicates based on the schema information 36 in the registered IBI microservice 26.

(4) Communication between the IBI microservice 26 and the individual application 34 of registered smartphone 12 is permitted. But communication between the IBI microservice 26 and the individual application 34 of unregistered smartphones 12 is not permitted.

Note that, the same process as described above is performed when connecting not only the smartphone 12 but also the beacon device 14 to the ifLink application 22, and thus, the detailed explanation will be omitted.

FIGS. 2A and 2B illustrate examples of sending and receiving a beacon packet. FIG. 2A is a sequence diagram for the case without delivery acknowledgement. FIG. 2B is a sequence diagram for the case with delivery acknowledgement. The delivery acknowledgement is implemented in a protocol higher than the IBI module 32.

Since the beacon packets are sent simultaneously (broadcast communication), multiple ifLink applications 22 will be executed respectively if there are multiple edge computers 10. Conversely, instructions (job notifications) and the like from multiple ifLink applications 22 may also overlap. However, as described below, the identification information (devicename, deviceserial) of the IBI module 32 or IBI substrate 42 from which the receive signal is sent can be registered in the schema information 36. Thus, the IBI microservice 26 can filter out sensor value notifications from unintended sources. Furthermore, the IDs of the IBI modules 32 (Member ID and Module ID, described below) can also be registered in the schema information 36. Thus, the IBI module 32 can filter information not addressed to itself.

In the case of no delivery acknowledgement, as shown in FIG. 2A, the source (individual application 34 in this example) transmits a request to the IBI module 32 to send a beacon packet. The IBI module 32 transmits the beacon packet $P_1$ (denoted as Beacon in the figure of this example) at each transmission interval $T_{interval}$ to the destination (IBI microservice 26 in this example). The transmission time is $T_{duration}$.

The IBI module 32 stops transmitting the beacon packet after a certain period of time from the start of beacon packet transmission.

If there is a delivery acknowledgement, as shown in FIG. 2B, the individual application 34 transmits a request to transmit a beacon packet to the IBI module 32. The IBI module 32 transmits the beacon packet $P_1$ to the IBI microservice 26. The transmission time is $T_{duration}$.

The IBI microservice 26 performs a scan. When the IBI microservice 26 receives the beacon packet $P_1$, it transmits a response packet $R_1$ to the IBI module 32. The transmission time is $T_{duration}$. The beacon packet $P_1$ received by the IBI microservice 26 is referenced by the ifLink application 22.

If the IBI module 32 receives the response packet $R_1$ before a certain time ($2 \times T_{duration}$) has elapsed since the start of beacon packet transmission, it notifies the individual application 34 of the transmission result and stops transmitting the beacon packet.

If the IBI module 32 does not receive the response packet $R_1$ after the certain time ($2 \times T_{duration}$) from the start of beacon packet transmission, it retransmits the beacon packet $P_1$ to the IBI microservice 26. The retransmission is repeated up to a predetermined number of times ($N_{retry}$).

FIGS. 2A and 2B illustrate examples of the beacon packet $P_1$ sent from the individual application 34 (source) to the IBI microservice 26 (destination). An example of information sent from the individual application 34 to the IBI microservice 26 is a sensor value notification. The beacon packet may also be sent from the IBI microservice 26 to the individual application 34. In that case, a sensor value response or job notification is sent from the IBI microservice 26 to the individual application 34 via the beacon packets. If the beacon packet is sent from the individual application 34 to the IBI microservice 26, a job result notification may also be sent via the beacon packet.

Beacon Packet

FIGS. 3A and 3B illustrate an example of the structure of a beacon packet. FIG. 4 illustrates an example of data contained in a beacon packet.

A beacon packet consists of 32 bytes. The basic data structure is that the byte length of the data part is written in the first byte, followed by the data part, and this structure is repeated.

A length in byte 0 indicates that the data part is 2 bytes. Bytes 1 to 2 are the data part.

A length in byte 3 indicates that the data part is 28 bytes. Bytes 4 to 31 are the data part.

The first byte of the data part indicates the AD type of the data. The second and subsequent bytes of the data part are the actual data. The fact that the AD type of byte 1 is 0x01 indicates that the data type is a beacon packet flag. Similarly, the AD type of 0xFF in byte 4 indicates that the data type is Manufacturer Specific Data.

Bytes 0 to 6 are defined by Bluetooth. The range available to users for their own use is bytes 7 to 31.

A company ID in bytes 5 to 6 is information which identifies the organization which operates the IoT system and is the identification information of the (only) organization proposing the IBI.

A member ID (identification information of the user of the electronic device) in bytes 7 to 8 is information which identifies a company or organization. The reserved value (reserved) is intended for use in special applications and is prohibited for normal use.

A module ID (identification information of non-specific application) in bytes 9 to 10 is the internal identification information of the program module for each company or organization. When multiple individual applications 34 of a certain company or organization are installed in a user's smartphone 12, module ID can be assigned to each non-specific application 34 such that the data structures can be identified.

A frame type in byte 11 indicates the transmission type (details will be shown in FIGS. 5 and 6).

Parameters (transmission information) from byte 12 to byte 31 indicate unique parameters (details will be shown in FIGS. 10 and 12).

FIG. 5 illustrates an example of a frame type structure. The frame type consists of one byte and consists of a REQ/RES flag indicating request/response, REPLY flag indicating whether or not a response to the command is required, and actual command (COMMAND). In the case of sensor value transmission, the request is to send the sensor value from the individual application 34 to the IBI microservice 26, and the response is to send a "sensor value received" response from the IBI microservice 26 to the individual application 34.

Bit 7 is a REQ/RES flag field. If the transmission type is a request, the flag is set to 0. If the transmission type is a response, the flag is set to 1.

Bit 6 is a REPLY flag field. If no response is required, the flag is set to 0. If a response is required, the flag is set to 1.

Commands from bits 5 to 0 are 1: device registration (unused), 2: device registration result (unused), 3: sensor value notification, 4: job notification, and 5: job result notification.

FIG. 6 illustrates an example of a frame type set value. For example, the frame type for a sensor value response (no response required) is 0x03. The frame type for a sensor value response (response required) is 0x43. An example of a sensor value notification is the transmission of a sensor value from the individual application 34 as a sensor to the IBI microservice 26.

A set value of the frame type for the sensor value response is 0xC3. An example of the sensor value response is, in the case of a sensor value notification (response required), the transmission of a "sensor value received" response from the IBI microservice 26 to the individual application 34 as a sensor.

The frame type set value for a job notification (no response required) is 0x04. The frame type for a job notification (response required) is 0x44. An example of the job notification is the transmission of the instruction "perform XX operation" from the IBI microservice 26 to the individual application 34 as a THEN module.

The frame type of a job result notification is 0xC4. An example of the job result notification is the transmission of a "XX operation performed" response from the individual application 34 as a THEN module to the IBI microservice 26.

FIG. 7 illustrates an example of the structure of a parameter part included in a beacon packet. The parameter part stores multiple parameters. Each parameter includes a TL part and a VAL part. The TL part includes one byte which consists of a TYPE field and a LENGTH field.

The TYPE field consists of bits 7 to 5 and indicates the parameter type: 0 indicates reserved, 1 indicates integer (int) type, 2 indicates single-precision floating-point number (float) type, 3 indicates double-precision floating-point number (double) type, 4 indicates string (string) type, and 5 indicates binary (binary) type.

The LENGTH field consists of bits 4 to 0 and indicates the size of the parameter (=size of VAL part (in bytes)−1). If the parameter is of int type, the LENGTH field is 0, 1, 3, or 7. If the parameter is of float type, the LENGTH field is 3. If the parameter is of double type, the LENGTH field is 7. If the parameter is of string type, the LENGTH field is 0 to 18. If the parameter is of binary type, the LENGTH field is 0 to 18.

FIG. 8 illustrates an example of set value of the TL part. For example, if the type is int and the size is 1 byte, the set value of the TL part is 0x20. If the type is int and the size is 2 bytes, the set value of the TL part is 0x21. When the type is int and the size is 4 bytes, the set value of the TL part is 0x23. When the type is int and the size is 8 bytes, the set value of the TL part is 0x27.

If the type is a float type and the size is 4 bytes, the set value of the TL part is 0x43.

If the type is a double type and the size is 8 bytes, the set value of the TL part is 0x67.

If the type is a string type and the size is 1 byte, the set value of the TL part is 0x80. When the type is a string type and the size is 6 bytes, the set value of the TL part is 0x85. If the type is a string type and the size is 19 bytes, the set value of the TL part is 0x92.

When the type is a binary type and the size is 1 byte, the set value of the TL part is 0xA0. When the type is a binary type and the size is 19 bytes, the set value of the TL part is 0xB2.

FIG. 9 illustrates an example of the schema information of the embodiment. As properties, a device name (devicename), device serial number (deviceserial), time stamp, member ID (memberid), module ID (moduleid), and parameter 1 (param1) to parameter 4 (param4) are described. A device name SampleDevice1 corresponds to the smartphone 12*a*. A device name SampleDevice2 corresponds to the smartphone 12*b*.

FIG. 10 illustrates an example of the parameters in a beacon packet for the sensor value notification. The parameters for the sensor value notification are stored in the beacon packet from parameter 1 to parameter 4 in this order. In this example, 0x20 in byte 12 indicates that the first parameter (param1) is an int type of 1 byte, and byte 13 indicates its value (0). 0x43 in byte 14 indicates that the next parameter (param2) is a float type of 4 bytes, and bytes 15 to 18 indicate its value (1.2). In this example, the individual application 34 has two sensors, e.g., a temperature sensor and a humidity sensor. The sensor values are stored in the param1 and param2, with param1 indicating temperature and param2 indicating humidity. The number of parameters is not limited to four; the number is variable, depending on the data to be transmitted.

FIGS. 11A and 11B illustrate examples of sending and receiving a beacon packet for the sensor value notification. FIG. 11A is a sequence diagram for the case without delivery acknowledgement. FIG. 11B is a sequence diagram for the case with delivery acknowledgement.

In the case of no delivery acknowledgement, as shown in FIG. 11A, the individual application 34 sends a sensor value to the IBI module 32. The IBI module 32 sends a beacon packet including sensor information to the IBI microservice 26 every transmission interval $T_{interval}$. The transmission time is $T_{duration}$.

The IBI module 32 stops transmitting the beacon packet after a certain amount of time has elapsed since the start of the beacon packet transmission.

The IBI microservice 26 sends a notifyRecvData: void to a DeviceConnector. The DeviceConnector sends send_data: long to an ifLinkConnector. The ifLinkConnector sends send_data: int to an IEPAService. Specifically, when the IBI microservice 26 receives a beacon packet from the IBI module 32, it checks the validity of the beacon packet, extracts the sensor value from the beacon packet, and notifies the DeviceConnector of the received sensor value via the notifyRecvData( ) API. The DeviceConnector sends the sensor value to the ifLinkConnector via the send_ data( ) API. The ifLinkConnector sends the sensor value to the IEPAService via the send_data( ) API. The notifyRecv-Data( ) is an API used by the IBI microservice 26 to notify the sensor value to the DeviceConnector.

If there is a delivery acknowledgement, as shown in FIG. 11B, the individual application 34 sends the sensor value to the IBI module 32. The IBI module 32 sends a beacon packet including the sensor information to the IBI microservice 26. The transmission time is $T_{duration}$:

The IBI microservice 26 performs a scan. When the IBI microservice 26 receives the beacon packet, it sends a response packet to the IBI module 32. The transmission time is $T_{duration}$.

If the IBI module 32 receives the response packet before a certain time ($2 \times T_{duration}$) has elapsed since the start of beacon packet transmission, it notifies the individual application 34 of the transmission result and stops transmitting the beacon packet.

If the IBI module 32 does not receive the response packet after the certain time ($2 \times T_{duration}$) from the start of beacon packet transmission, it retransmits the beacon packet to the IBI microservice 26. The retransmission is repeated up to a predetermined number of times ($N_{retry}$).

The IBI microservice 26 sends the notifyRecvData void to the DeviceConnector when it receives the beacon packet. The deviceConnector sends the send_data long to the ifLinkConnector. The ifLinkConnector sends the send_data int to the IEPAService.

FIG. 12 illustrates an example of the parameters in a beacon packet for the job notification. The parameters for the job notification are the same as those for the sensor value notification, with parameter 1 to parameter 4 being stored in the beacon packet in this order. In this example, the individual application 34 includes two sensors, e.g., a temperature sensor and a humidity sensor. A job for a temperature measurement is stored in the param1. A job for a humidity measurement is stored in the param2. The number of parameters is not limited to 4; the number is variable, depending on the job to be sent.

Figure 13A:
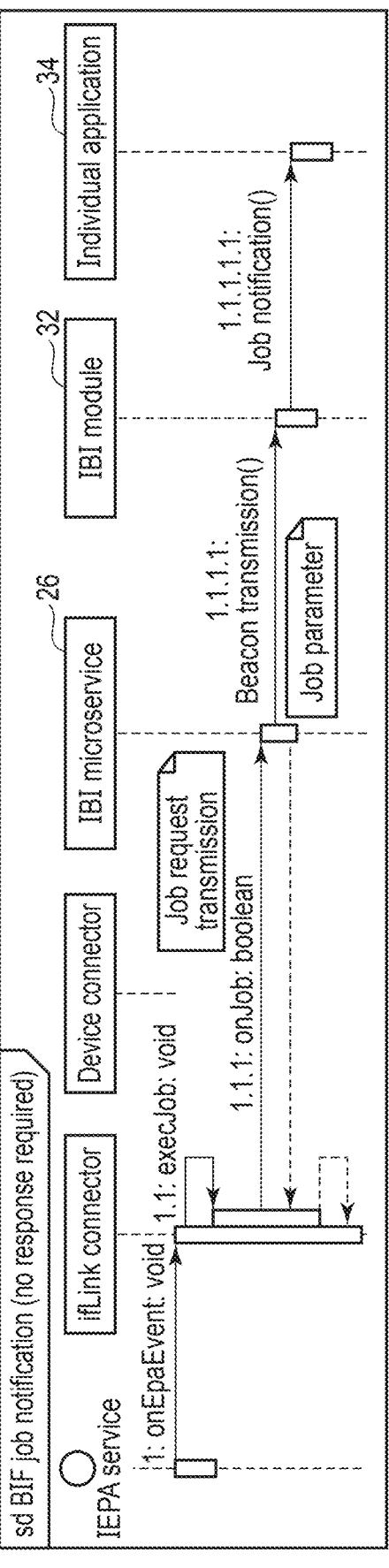
FIG. 13A illustrates an example of sending and receiving a beacon packet for job notification.

FIG. 13A and FIG. 13B illustrate examples of sending and receiving a beacon packet for the job notification. FIG. 13A is a sequence diagram for the case without delivery acknowledgement. FIG. 13B is a sequence diagram for the case with delivery acknowledgement.

In the case of no delivery acknowledgement, as shown in FIG. 13A, the IEPAService sends an onEpaEvent:void to the ifLinkConnector. The ifLinkConnecto sends a job request (onJob:boolean) to the IBI microservice 26. Specifically, the IEPAService notifies the target ifLinkConnector using an onEpaEvent( ) API when the job notification is required. Then, when the ifLinkConnector receives the job notification from the IEPAService, it notifies the IBI microservice 26 using the onJob( ) API.

The IBI microservice 26 sends a beacon packet including job parameters to the IBI module 32 every transmission interval $T_{interval}$. The transmission time is $T_{duration}$. When the IBI module 32 receives the beacon packet, it sends the job notification to the individual application 34. The individual application 34 performs the operation in response to the job notification.

The IBI microservice 26 stops transmitting the beacon packet after a certain amount of time has elapsed since the start of beacon packet transmission.

If there is a delivery acknowledgement, the IEPAService sends the onEpaEvent:void to the ifLinkConnector. The ifLinkConnecto sends the job request (onJob:boolean) to the IBI microservice 26 as shown in FIG. 13B.

The IBI microservice 26 sends a beacon packet containing job parameters to the IBI module 32. The transmission time is $T_{duration}$.

The IBI module 32 performs a scan. When the IBI module 32 receives the beacon packet, it sends a response packet to the IBI microservice 26. The transmission time is $T_{duration}$. When the IBI module 32 receives the beacon packet, it sends the job notification to the individual application 34. The individual application 34 performs the process in response to the job notification.

The IBI microservice 26 stops sending the beacon packet if it receives the response packet before a certain time ($2 \times T_{duration}$) has elapsed since it started sending the beacon packet. If the IBI microservice 26 does not receive the response packet for the certain time ($2 \times T_{duration}$) has elapsed since the start of the transmission of the beacon packet, the IBI microservice 26 retransmits the beacon packet to the IBI module 32. The retransmission is repeated up to a predetermined number of times ($N_{retry}$).

When the individual application 34 performs an operation in response to the job notification, it sends the job result to the IBI module 32. The IBI module 32 sends a beacon packet including the job result to the IBI microservice 26. Upon receipt of the beacon packet including the job results, the IBI microservice 26 sends a response packet to the IBI module 32.

Examples of Implementation

FIG. 14 is a sequence diagram illustrating an example of sending and receiving a beacon packet when the electronic device of the embodiment is implemented in an IF application (without delivery acknowledgement). In this example, it is assumed that the smartphone 12 includes a sensor and the individual application 34 sends a sensor value to the ifLink application 22, i.e., the individual application 34 is an IF app.

The member ID of the user of the smartphone 12 and the module ID of the individual application 34 are set.

The individual application 34 uses Java language to generate a beacon IF object. The beacon IF object is a class denoted as a BeaconIf which is included in the IBI module 32. The individual application 34 initializes the IBI module 32 by assigning the member ID and module ID of the individual application 34.

The individual application 34 obtains a sensor value from the sensor.

The individual application 34 calls a sendSensorNoReply( ) of the beacon IF object when sending the sensor value to the IBI microservice 26. The sensor value is specified by a HashMap<String, Object> type. Examples of sensor values are param1=0, param2=1.2, param3=test, and param4=hello.

The developer of the IoT system generates schema information and registers the generated schema information to the IBI Microservice 26. FIG. 15 illustrates an example of the schema information generated at this time. As properties, an application name (applicationname), application serial number (applicationserial), timestamp, member ID (memberid), module ID (moduleid), and parameter 1 (param1) to parameter 4 (param4) are described. Thereby, the IBI microservice 26 can receive the sensor value from the individual application 34 as an IF app.

The IBI module 32 sends a beacon packet including the sensor value to the IBI microservice 26. Although this is not shown in FIG. 14 but as shown in FIG. 11A, the IBI module 32 sends the beacon packet every transmission interval $T_{interval}$ and stops sending the beacon packet after a certain amount of time has elapsed from the start of beacon packet transmission.

FIG. 16 is a sequence diagram illustrating an example of sending and receiving a beacon packet when the electronic device of the embodiment is implemented in a THEN application (without delivery acknowledgement). In this example, it is assumed that the smartphone 12 includes an LED and the individual application 34 turns on the LED in response to a job notification from the IBI microservice 26, i.e., the individual application 34 is a THEN application.

A member ID of the user of the smartphone 12 and a module ID of the individual application 34 are set.

The individual application 34 uses Java language to generate a beacon IF object. The Beacon IF object is a class denoted as a BeaconIf included in the IBI module 32. The individual application 34 initializes library (IBI module 32) by assigning the member ID and the module ID of the individual application 34.

When the individual application 34 receives the job notification from the IBI microservice 26, it calls a startScan( ) of the beacon IF object.

The IBI microservice 26 sends a beacon packet including the job notification to the IBI module 32. Although this is not shown in FIG. 16 but as shown in FIG. 13A, the IBI microservice 26 sends the beacon packet every transmission interval $T_{interval}$, and stops sending the beacon packet after a certain amount of time has elapsed from the start of beacon packet transmission.

When the IBI module 32 receives the beacon packet including the job notification, an eventJob( ) of the individual application 34 is called. The IBI module 32 implements a specific processing of the job within the eventJob( ) Job parameters are specified by a HashMap<String, Object> type. Examples of the job parameters are param1=0, param2=1.2, param3=test, and param4=hello.

The developer of the IoT system generates schema information and registers the generated schema information to the IBI microservice 26. An example of the schema information generated at this time is similar to the example of FIG. 15. Note that, the difference is that the application name becomes a THENapplication1. Thereby, the individual application 34 which is a THEN application can receive the job notification from the IBI microservice 26.

The IBI module 32 calls a stopScan( ) of the beacon IF object to stop job reception.

Figure 17:
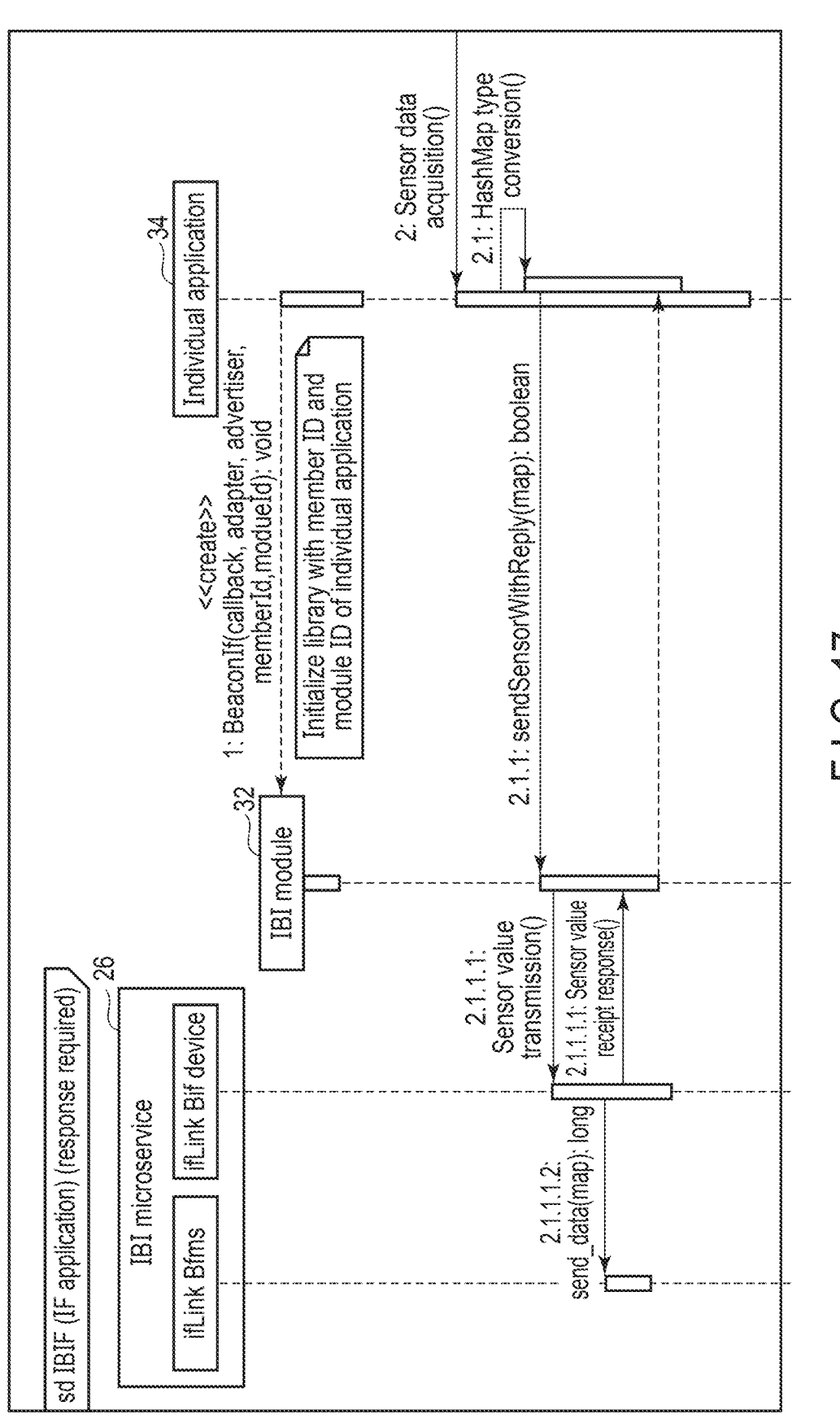
FIG. 17 is a sequence diagram illustrating another example of sending and receiving a beacon packet.

FIG. 17 is a sequence diagram illustrating an example of sending and receiving a beacon packet when the electronic device of the embodiment is implemented in an IF application (with delivery acknowledgement). In this example, as described above, it is assumed that the smartphone 12 includes a sensor and the individual application 34 sends a sensor value to the ifLink application 22, i.e., the individual application 34 is an IF application.

The member ID of the user of the smartphone 12 and module ID of the individual application 34 are set.

The individual application 34 uses Java language to generate a Beacon IF object. The Beacon IF object is a class denoted as a BeaconIf which is included in the IBI module 32. The individual application 34 initializes the IBI module 32 by assigning the member ID and the module ID of the individual application 34.

The individual application 34 obtains the sensor value from the sensor.

The individual application 34 calls a sendSensorWithReply( ) of the beacon IF object when sending the sensor value to the IBI microservice 26. The sensor value is specified by a HashMap<String, Object> type. Examples of the sensor values are param1=0, param2=1.2, param3=test, and param4=hello.

The developer of the IoT system generates the schema information as shown in FIG. 15 and registers the generated schema information to the IBI microservice 26. Thereby, the IBI microservice 26 can receive the sensor value from the individual application 34 which is the IF application.

The IBI module 32 sends a beacon packet including the sensor value to the IBI microservice 26. Although this is not shown in FIG. 17 but as shown in FIG. 11B, the IBI microservice 26 performs a scan, and when the IBI microservice 26 receives the beacon packet, it sends a response packet to the IBI module 32. The transmission time is $T_{duration}$.

If the IBI module 32 receives the response packet before a certain time $(2 \times T_{duration})$ elapsed since the start of beacon packet transmission, it notifies the individual application 34 of the transmission result and stops transmitting the beacon packet.

If the IBI module 32 does not receive the response packet after the certain time $(2 \times T_{duration})$ from the start of beacon packet transmission, it retransmits the beacon packet to the IBI microservice 26. The retransmission is repeated up to a predetermined number of times $(N_{retry})$.

FIG. 18 is a sequence diagram illustrating an example of sending and receiving a beacon packet when the electronic device of the embodiment is implemented in a THEN application (with delivery acknowledgement). In this example, as described above, it is assumed that the smartphone 12 includes an LED and that the individual application 34 turns on the LED in response to a job notification from the IBI microservice 26, i.e., the individual application 34 is a THEN application.

The member ID of the user of the smartphone 12 and the module ID of the individual application 34 are set.

The individual application 34 uses Java language to generate a Beacon IF object. The beacon IF object is a class denoted as a BeaconIf which is included in the IBI module 32. The individual application 34 initializes the IBI module 32 by assigning the member ID and module ID of the individual application 34.

When the individual application 34 receives the job notification from the IBI microservice 26, it calls a startScan( ) of the beacon IF object.

The IBI microservice 26 sends a beacon packet including the job notification to the IBI module 32.

When the IBI module 32 receives the beacon packet including the job notification, it sends a response packet to the IBI microservice 26. When the IBI module 32 receives the beacon packet including the job notification, an eventJob( ) in the individual application 34 is called. The IBI module 32 implements a specific processing of the job within the eventJob( ). Job parameters are specified by a HashMap<String, Object> type. Examples of the job parameters are param1=0, param2=1.2, param3=test, and param4=hello.

The developer of the IoT system generates schema information and registers the generated schema information to the IBI microservice 26. An example of the schema information generated at this time is similar to the example of FIG. 15. Note that, the difference is that the application name becomes a THENapplication1. Thereby, the individual application 34 which is a THEN application can receive the job notification from the IBI microservice 26.

The individual application 34 calls a sendJobResultWithReply( ) of the beacon IF object when sending the job result notification to the IBI microservice 26. The job result parameter is specified by a HashMap<String, Object> type. Examples of the job result parameters are param1=0, param2=1.2, param3=test, and param4=hello.

The IBI module 32 sends a beacon packet including the job result to the IBI microservice 26. Upon receiving the beacon packet, the IBI microservice 26 sends the response packet to the IBI module 32.

The IBI module 32 calls a stopScan( ) of the beacon IF object to stop job reception.

Figure 19:
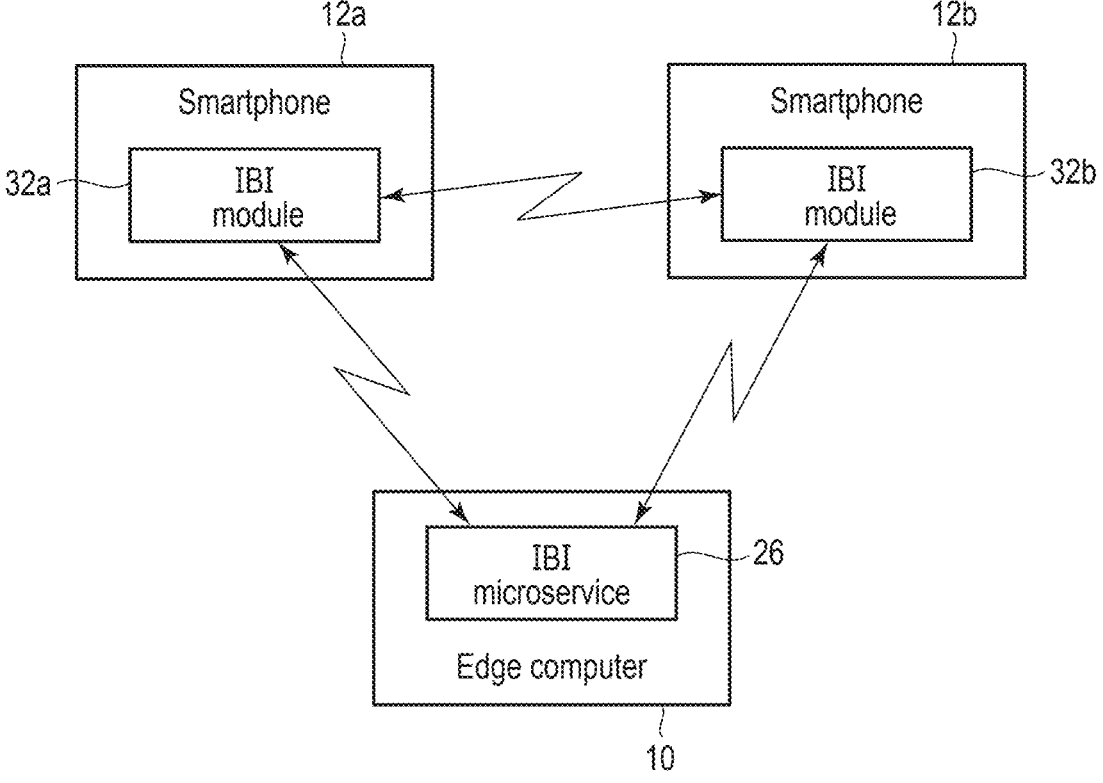
FIG. 19 is a block diagram illustrating a structural example of a system for testing the electronic device of the embodiment.

FIG. 19 is a block diagram illustrating a structural example of a system for testing the operation of the electronic device (edge computer 10) of the embodiment. The IBI modules 32a and 32b are installed in the smartphones 12a and 12b. The IBI microservice 26 is installed in the edge computer 10. In this state, it can be verified that the individual application 34 functions correctly and that the smartphones 12a and 12b and the edge computer 10 can communicate with each other.

FIG. 20 illustrates an example of a screen display of the smartphone 12 (for example, smartphone 12a) when testing the operation of the electronic device of the embodiment. The smartphone 12a as an IBI tester performs setting of the beacon packet. Specifically, the smartphone 12a sets the scan mode, and the number of retransmission repetitions, etc.

When a certain schema information is selected in a selection list of the schema information, a schema file containing the certain schema information is read to the smartphone 12a from the data folder in the smartphone 12a. The screen for setting parameters to be sent based on the schema information is displayed.

When the parameters are entered and "Publish" button is pressed, the beacon packet is sent to other electronic devices, i.e., the smartphone 12b and edge computer 10, for a predetermined number of transmissions. When another electronic device receives the beacon packet, the other electronic device sends a delivery acknowledgement to the smartphone 12a. When the smartphone 12a receives the delivery acknowledgement, it displays a message such as "Received by XXXX".

The smartphone 12a has a display device for displaying data from the other electronic device. By displaying the received data, whether or not the data being transmitted by the other electronic device is correct can be verified.

FIG. 21 illustrates another example of an IoT system including the electronic device of the embodiment. The IoT system includes the cloud server 18, edge computer 10, a module (device) 102 in real space, and a module (service) 104 in cyber space. The cloud server 18 stores the rule information. The edge computer 10 stores the rule information downloaded from the cloud server 18 in the rule memory 30 and links the modules 102 and 104 based on the rule information.

The modules 102 and 104 are connected to the edge computer 10. Wireless connection is used to connect the module 102 with the edge computer 10. Examples of wireless connection are Bluetooth, cellular phone lines, Wi-Fi, etc.

The cloud server 18 and the edge computer 10 can communicate with each other via a network 108. The network 108 may be a wired or wireless network. The connection between the edge computer 10 and the network 108 and the connection between the cloud server 18 and the network 108 may be wireless or wired. Examples of wireless connection are Bluetooth, cellular phone lines, Wi-Fi, etc. Examples of wired connection are wired LAN, etc.

In FIG. 21, one edge computer 10 is shown, but many edge computers may be capable of communicating with the cloud server 18.

Examples of modules 102 in real space include, but are not limited to, a sensor 102a, a beacon device 102b, a home appliance 102c, the smartphone (including a tablet and another mobile device) 12, a head mounted display (HMD) 102d, an IoT device 102e, and a GPS satellite 102f. The whole or part of the module 102 in real space may be located outside the edge computer 10 and connected to the edge computer 10 via communication lines. Alternatively, the whole or part of the module 102 may be built into the edge computer 10. Examples of modules 102 that are built in include, but are not limited to, a temperature sensor, pressure sensor, and gyro.

Examples of modules 104 on cyberspace include, but are not limited to, the Web service server 16 and an IoT service server 104a.

The edge computer 10 includes microservices which are dedicated softwares to respectively control the modules 102 and 104.

The microservice means a control means formed by a program using an object-oriented programming language. The control target (object) of the microservice is not limited to a device, but includes processing, content, and information/data. Thus, for example, a program software using AI technology to control transitions between Web pages or screen operations corresponding to specific Web pages is also included as a type of the microservice or a part of the microservice. Similarly, a program software which uses AI technology to automatically extract the number of people appearing in specific video content, for example, or to analyze acquired data (using statistical analysis, for example), is also included as a type of the microservice or a part thereof. The information obtained as a result of the analysis and the recording device which stores the information are treated as human-recognizable entity/state/information. In addition, since microservice is a form of control means, as described above, installing microservice enables control of a control object (human-recognizable entity/state/information) by the edge computer 10 and the cloud server 18. When the detailed procedures are specified in this "software form", if the control means is formed by a program using an object-oriented programming language, such as Java or Objective-C, it is possible to make effective use of program assets (e.g., incorporation (import) in other programs or invocation (API command issuance)). Furthermore, if the program is written in Java language, which is OS (operating system)-independent, the versatility of the control means is improved.

An example of microservice includes, but are not limited to, sensor microservice 122a for the sensor 102a, beacon microservice 122b for the beacon device 102b, appliance integration microservice 122c for the home appliance 102c, the IBI microservice 26 for the smartphone 12, HMD microservice 122d for the HMD 102d, IoT device microservice 122e for the IoT device 102e, GPS microservice 122f for the GPS satellite 102f, Web server microservice 28 for the Web service server 16, and IoT server microservice 124 for the IoT service server 104a.

The GPS microservice 122f obtains GPS position information obtained from the GPS satellite 102f. The GPS satellite 102f may include RTK-GNSS with high measurement accuracy.

The microservice 124 for the IoT server is controlled with the IoT service server 104a in a cooperative manner. Furthermore, the edge computer 10 may incorporate not only the microservice 124 for the IoT server, but also microservice which can individually access any service available in cyberspace, not shown in the figure, in the same line with the microservice 28 for the web server 16. An example of service on the cyberspace includes, but is not limited to, user service such as automatic trading of securities (stocks of specific issues), automatic ordering of a specific product and automatic transfer of payment for received product (billing process), an application for purchase of a movie or music ticket, an application for reservations for travel, etc.

When microservice which can individually access various services in cyberspace is embedded in the edge computer 10, users can enjoy plenty of collaborative service which connect different service in cyberspace.

By incorporating the microservices 26, 122a to 122f controlling the module 102 in real space into the edge computer 10 in the same line as the microservice 28 for the Web server 16, advanced collaborative service of both service provided by the module 102 in real space (tangible services) and service provided by the module 104 in cyberspace (intangible services) can be presented to users seamlessly without any sense of incongruity. Combination methods between various services for providing this advanced collaborative service is specified by the rule information. Service using intangible objects includes a treatment method, a calculation method, an information acquisition method, reservation information, educational information, and recommendation information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device configured to communicate with a second electronic device, wherein the electronic device is configured to execute a non-specific application and a first communication application, the second electronic device is configured to execute a specific application and a second communication application, when the first communication application and the second communication application are executed, the electronic device communicates with the second electronic device, when the specific application is executed, the second electronic device is configured to:

determine whether or not a state of the electronic device is a first state, and when the state of the electronic device is the first state, make the electronic device perform a first operation via the second communication application;

when the first communication application is executed, the electronic device is configured to transmit a beacon, and the beacon includes identification information of a user of the electronic device, identification information of the non-specific application, and transmission information notified to the specific application by the non-specific application.

2. The electronic device of claim 1, wherein the transmission information includes data acquired by the non-specific application and data indicative of process result of the non-specific application.

3. An electronic device configured to communicate with a second electronic device, wherein the electronic device is configured to execute the specific application and a first communication application, the second electronic device is configured to execute a non-specific application and a second communication application, when the first communication application and the second communication application are executed, the electronic device communicates with the second electronic device, when the specific application is executed, the electronic device is configured to:

determine whether or not a state of the second electronic device is a first state, and when the state of the second electronic device is the first state, make the second electronic device perform a first operation via the first communication application;

when the first communication application is executed, the electronic device is configured to transmit a beacon, and the beacon includes identification information of a user of the second electronic device, identification information of the non-specific application, and transmission information notified to the non-specific application from the specific application.

4. The electronic device of claim 3, wherein the transmission information includes instruction of the specific application with respect to the non-specific application.

5. A system having a processor, comprising:

a first electronic device, and a second electronic device, wherein the first electronic device is configured to execute a non-specific application and a first communication application, the second electronic device is configured to execute a specific application and a second communication application, when the second communication application and the first communication application are executed, the electronic device communicates with the second electronic device, when the specific application is executed, the second electronic device is configured to:

determine whether or not a state of the first electronic device is a first state, and when the state of the first electronic device is the first state, make the first electronic device perform a first operation via the second communication application;

when the first communication application is executed, the first electronic device is configured to transmit a first beacon, the first beacon includes identification information of a user of the first electronic device, identification information of the non-specific application, and first transmission information notified to the specific application by the non-specific application, when the second communication application is executed, the second electronic device is configured to transmit a second beacon, and the second beacon includes the identification information of the user of the first electronic device, the identification information of the non-specific application, and second transmission information notified to the non-specific application by the specific application.

6. The system of claim 5, wherein the first transmission information includes data acquired by the non-specific application and data indicative of process result of the non-specific application; and the second transmission information includes instruction of the specific application with respect to the non-specific application.

7. The system of claim 5, wherein the specific application processes the first transmission information as different information based on the identification information of the user of the first electronic device.

* * * * *